United States Patent
Geissinger et al.

(10) Patent No.: US 10,275,229 B2
(45) Date of Patent: Apr. 30, 2019

(54) ENCODED DATA OBJECT NOTATION PERSISTENCE FORMAT

(71) Applicant: SAP SE, Walldorf (DE)

(72) Inventors: Steffen Geissinger, Wiesloch (DE); Burak Kurt, Istanbul (TR)

(73) Assignee: SAP SE, Walldorf (DE)

( * ) Notice: Subject to any disclaimer, the term of this patent is extended or adjusted under 35 U.S.C. 154(b) by 577 days.

(21) Appl. No.: 14/971,852

(22) Filed: Dec. 16, 2015

(65) Prior Publication Data

US 2017/0177604 A1    Jun. 22, 2017

(51) Int. Cl.
*G06F 17/00* (2006.01)
*G06F 8/41* (2018.01)

(52) U.S. Cl.
CPC .................. *G06F 8/4434* (2013.01)

(58) Field of Classification Search
CPC ............ G06F 17/3033; G06F 21/6227; G06F 3/0619; G06F 8/20; G06F 17/30159
See application file for complete search history.

(56) References Cited

U.S. PATENT DOCUMENTS

| | | | |
|---|---|---|---|
| 8,161,024 B2 | 4/2012 | Renkes et al. | |
| 8,321,429 B2 | 11/2012 | Kirk et al. | |
| 2006/0074989 A1* | 4/2006 | Laborczfalvi | G06F 21/10 |
| 2009/0319518 A1 | 12/2009 | Koudas et al. | |
| 2015/0142819 A1 | 5/2015 | Florendo et al. | |
| 2016/0055220 A1* | 2/2016 | Joshi | G06F 17/30336 |
| | | | 707/722 |
| 2017/0177672 A1 | 6/2017 | Geissinger et al. | |

OTHER PUBLICATIONS

"pJSON (persistent json)—Vesper," OneCommons, onecommons.org, archived Jun. 2013, 7 pages.
Veloso, "JSON to Persistent Data Store (CoreData, etc.)," stackoverflow.com, Apr. 1, 2010, 2 pages.
"JSPON: JavaScript Persistent Object Notation," jspon.org, visited Sep. 4, 2015, 2 pages.
Savla, "CJSON—Compressed JSON," codeproject.com, Feb. 5, 2014, 6 pages.
"Convert Bson to string—MongoDB/Javascript," stackoverflow website, Dec. 9, 2012, 1 page.
Specification Version 1.0, BSON Specification, bsonspec.org website, visited Nov. 4, 2015, 4 pages.
"BSON," Wikipedia website, visited Nov. 4, 2015, 3 pages.
"Smile (data interchange format)," Wikipedia website, visited Nov. 4, 2015, 2 pages.
"UBJSON," Wikipedia website, visited Nov. 4, 2015, 3 pages.
"SmileFormatSpec," fasterxml website, visited Nov. 4, 2015, 12 pages.
"Document-oriented database," Wikipedia website, visited Nov. 4, 2015, 10 pages.

(Continued)

*Primary Examiner* — Truong V Vo
(74) *Attorney, Agent, or Firm* — Klarquist Sparkman, LLP

(57) ABSTRACT

An encoded data object notation persistence format can be used in a variety of scenarios to advantage. The encoded format accommodates key name-value pairs and can employ dictionary compression to reduce the amount of storage needed to represent a data object. Searching and querying a collection of encoded data objects can be done more efficiently by taking advantage of the format.

21 Claims, 17 Drawing Sheets

(56) References Cited

OTHER PUBLICATIONS

"Introducing JSON," json.org website, visited Nov. 4, 2015, 4 pages.
"Standard ECMA-404: The JSON Data Interchange Format," ECMA International, Oct. 2013, 14 pages.
"SIMD," Wikipedia website, visited Nov. 19, 2015, 7 pages.
"Technical Overview," CouchDB website, visited Nov. 20, 2015, 8 pages.
"Dictionary coder," Wikipedia website, visited Nov. 20, 2015, 3 pages.
"Semi-structured data," Wikipedia website, visited Nov. 23, 2015, 3 pages.
"ObjectID," MongoDB Manual 3.0, MongoDB website, visited Nov. 24, 2015, 3 pages.
James Morle's Blog, "Oracle's In-Memory Database: The True Cost of Licensing," Jul. 25, 2014, 9 pages.
"Persistence (computer science)," Wikipedia, visited Dec. 2, 2015, 4 pages.
"Self-documenting," Wikipedia, visited Dec. 3, 2015, 2 pages.

\* cited by examiner

FIG. 13A

| | EXTENDED DICTIONARY 1330 | |
|---|---|---|
| ID | KEY NAME | DATA TYPE |
| $KI_1$ | $KN_1$ | $T_1$ |
| $KI_2$ | $KN_2$ | $T_2$ |
| ... | | |
| $KI_N$ | $KN_N$ | $T_N$ |
| 1335 | 1337 | 1339 |

FIG. 13B

| | EXTENDED DICTIONARY 1330 | |
|---|---|---|
| ID | KEY NAME | DATA TYPE |
| 1 | NAME | STRING |
| 2 | AGE | MIXED |
| ... | | |
| N | $KN_N$ | $T_N$ |

US 10,275,229 B2

ENCODED DATA OBJECT NOTATION PERSISTENCE FORMAT

BACKGROUND

Data objects are common in various data processing scenarios. For example, data objects are commonly used to communicate information between a web browser and the backend server. In such scenarios, object notation such as JavaScript Object Notation (JSON) has become a widespread and accepted format for sending and receiving data objects. Traditionally, such object notation formats are text-based and human-readable.

However, scalability and performance limitations can be encountered when implementing conventional formats for data objects.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method of constructing an encoded version of a data object comprises receiving the data object, wherein the data object is represented by data object notation comprising a plurality of key name-value pairs comprising key names and respective values; representing the key names of the key name-value pairs of the data object with dictionary compression, wherein the dictionary compression represents the key names with respective indexes into a key name dictionary, and the respective indexes are included in the encoded version of the data object; and for the values of the key name-value pairs of the data object, including offsets in the encoded version, wherein the offsets point to value blocks representing respective of the values, and the respective indexes into the key name dictionary are associated with the offsets.

In another embodiment, a system comprises one or more processing units; a stored key name dictionary comprising a plurality of key name entries indexed by a key name identifier identifying respective of the key name entries; and a data object encoder receiving a data object in data object notation as input and generating an encoded data object in an encoded data object notation persistence format as output; wherein the data object encoder is coupled to the stored key name dictionary and represents encoded data objects with one or more key name identifiers identifying key name entries appearing in the data object as key names.

In another embodiment, one or more computer-readable media comprise computer-executable instructions causing a computing system to perform a method of constructing an encoded version of a semi-structured document, the method comprising receiving the semi-structured document, wherein the semi-structured document comprises at least one data object represented by a lightweight data object notation persistence format comprising a plurality of attribute-value pairs comprising attributes and respective values and is represented in text form; representing the attributes of the attribute-value pairs of the data object with dictionary compression, wherein the dictionary compression represents the attributes with respective scalar values as indexes into a dictionary of attributes; including a header in the encoded version of the semi-structured document, wherein the header indicates a size of the encoded version; for the attributes of the attribute-value pairs, including the respective scalar values representing the attributes in the encoded version of the semi-structured document; for a given value out of the values represented in the attribute-value pairs: including an offset in the encoded version, wherein the offset points to a block representing the given value of an attribute-value pair, wherein the block comprises a field indicating a type of the given value and a field representing the given value; and outputting the encoded version of the semi-structured document, wherein the encoded version comprises a binary representation of the semi-structured document.

As described herein, a variety of other features and advantages can be incorporated into the technologies as desired.

BRIEF DESCRIPTION OF THE DRAWINGS

FIGS. 13A-B are block diagrams showing an extended dictionary storing type information for key names.

DETAILED DESCRIPTION

Example 1

Example Overview

An encoded data object notation persistence format can be used to facilitate processing of data objects. Software developers or service providers can take advantage of such functionality by using the format when developing software that searches, stores, or otherwise interacts with data objects. The technologies herein can result in more efficient searching, storing, and other processing of data objects when a computing system implements the format. For example, a large number of data objects can be searched more efficiently as described herein; query optimization can also rely on the technologies described herein, resulting in more efficient query processing.

Developers and service providers can thus benefit from the technologies because software incorporating the technologies can exhibit superior performance and/or less computing resource consumption. Similarly, end users also benefit from superior performance and/or less computing resource consumption.

Example 2

Example System Implementing Encoded Data Object Notation Format

Figure 1:
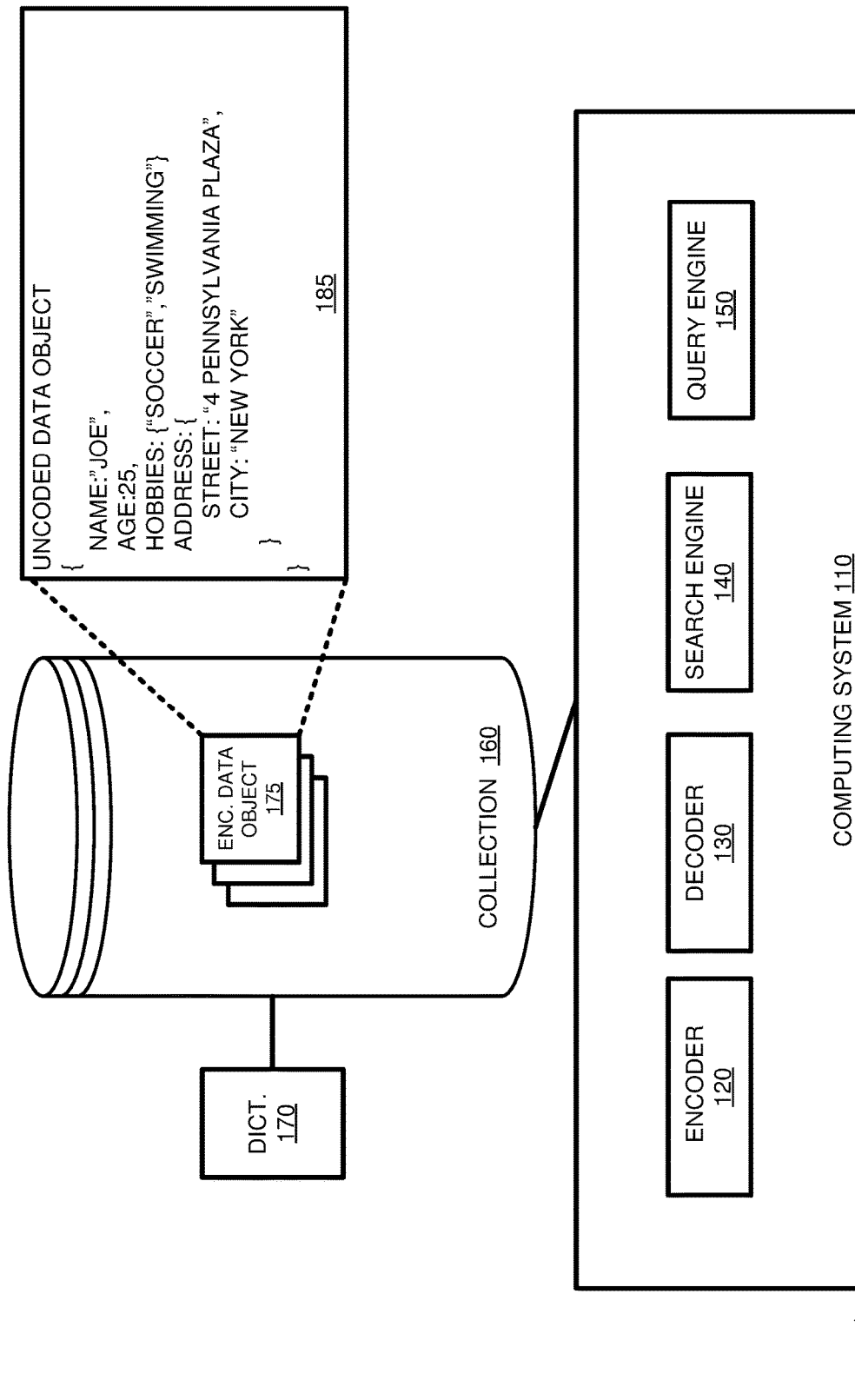
FIG. 1 is a block diagram of an example system for implementing an encoded data object notation persistence format.

FIG. 1 is a block diagram of an example system 100 implementing an encoded data object notation persistence format as described herein. The system 100 can store encoded data objects 175 in a collection 160 of encoded data objects. As described herein, a data object, whether uncoded or encoded, can comprise one or more key name-value pairs (e.g., a given pair comprises a key name and a value).

In the example, a computing system 110 accesses the collection 160 of encoded data objects 175. In practice, the computing system 110 can include any one or more of an encoder 120 configured to encode an uncoded data object 185 into an encoded data object 175, a decoder 130 configured to decode an encoded data object 175 into an uncoded data object 185, a search engine 140 configured to search the collection 160 of encoded data objects 175, a query engine 150 configured to run queries against the collection 160 of encoded data objects 175, or the like. Other computing systems can take advantage of the format by simply storing, communicating, or otherwise processing encoded data objects.

A stored key name dictionary 170 can be used in conjunction with the collection 160 to implement the technologies described herein. As described herein, the key name dictionary 170 can comprise a plurality of key name entries indexed by a key name identifier identifying respective of the key name entries.

For example, the encoder 120 can receive a data object 185 in data object notation as input and generate an encoded data object 175 in an encoded data object notation persistence format as output. The encoder 120 can be coupled to the stored key name dictionary 170 and represent encoded data objects with one or more key name identifiers identifying key name entries appearing in the data object 175, 185 as key names as described herein.

Although a variety of search scenarios are possible as described herein, the search engine 140 can receive a collection 160 of encoded data objects comprising the encoded data object 175 and output an indication of matches in the collection 160 for a target key name identifier. The search engine 140 can search the collection 160 for those encoded data objects having the target key name identifier via the key name identifiers stored in the collection as described herein.

Implementations employing the technologies can include permutations of one or more of encoding, decoding, searching, querying, and the like. For example, a possible scenario is to encode data objects and then search the encoded data objects. Found encoded data can then be decoded, etc. Other functionality, such as storing, transporting (e.g., sending, receiving, or the like), or otherwise processing encoded data objects can also benefit from the technologies due to reduced resource consumption (e.g., memory, disk space, network bandwidth, or the like). Different computing systems can implement different parts of the technology (e.g., one computing system encodes, and another computing system searches).

In any of the examples herein, although some of the subsystems are shown in a single box, in practice, they can be implemented as computing systems having more than one device. Boundaries between the components can be varied. For example, although the computing system 110 is shown as a single entity, it can be implemented by a plurality of devices.

In practice, the systems shown herein, such as system 100, can vary in complexity, with additional functionality, more complex components, and the like. For example, there can be multiple, different dictionaries shared by respective collections of encoded data objects (e.g., per-collection dictionaries). Additional computing systems can access the collection 160 in an enterprise computing scenario. As described herein, the collection 160 can be used to implement document containers for data objects in web service environments. Additional components can be included to implement security, redundancy, load balancing, report design, and the like.

In practice, a large number of different computing systems 110 (e.g., executing at plural instances of a client system, in the cloud, or the like) can be supported. Encoded data objects 175 can be transported efficiently between such computing systems 110 because they occupy less space than uncoded data objects 185.

The described computing systems can be networked via wired or wireless network connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the inputs, outputs, data objects (uncoded or encoded), dictionaries, mappings, objects, databases, and environments can be stored in one or more computer-readable storage media or computer-readable storage devices. The technologies described herein can be generic to the specifics of operating systems or hardware and can be applied in any variety of environments to take advantage of the described features.

Example 3

Example Functionality Used in Conjunction with Encoding Technologies

Figure 2:
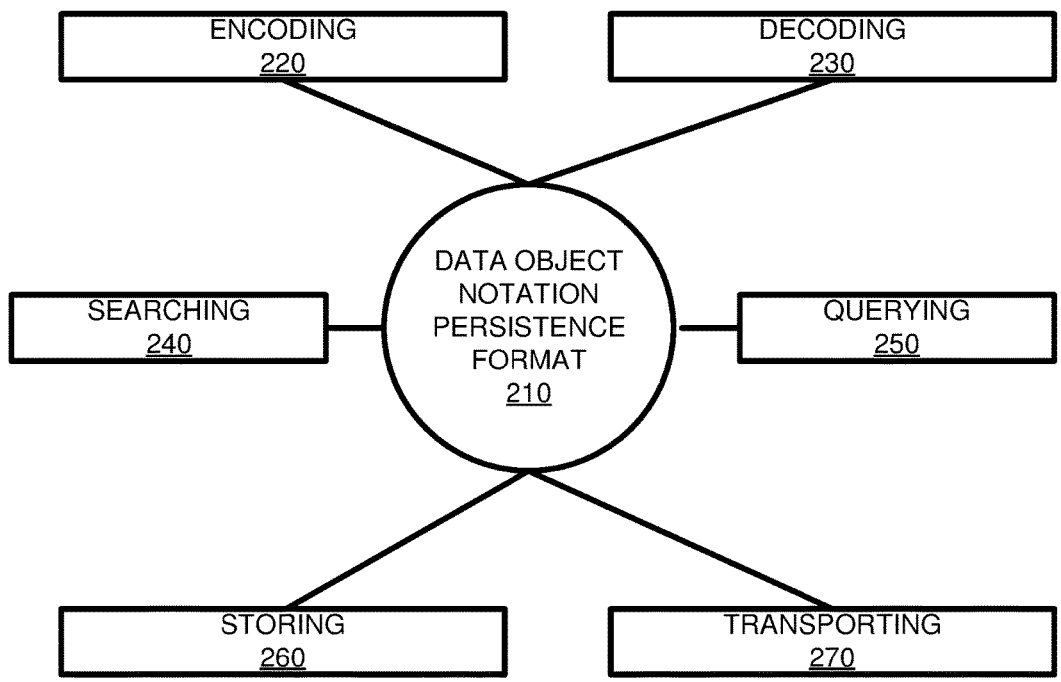
FIG. 2 is a diagram showing use cases for an encoded data object notation persistence format.

FIG. 2 is a diagram showing use cases 200 for an encoded data object notation persistence format as described herein.

The use cases 200 can benefit from the technologies in that fewer computing resources are needed to implement data objects. Encoding 220 is typically incorporated to enable the subsequent benefits to be provided. Decoding 230 can be used to convert an encoded data object to a conventional (e.g., ASCII) format. A decoded object can be desirable to allow compatibility with software that requires a decoded object.

Searching 240 and querying 250 can benefit in that matching key names can be more easily and more quickly found as described herein. Storing 260 can benefit in that fewer storage resources are typically needed to store an encoded data object. Transporting 270 (sometimes called "shipping encoded objects") can benefit in that less transmission bandwidth (e.g., network, bus, device, etc.) resources are needed to send or receive an encoded data object.

In practice, a system can take advantage of any one or more of the use case scenarios and thus embody multiple benefits. The benefits are examples only. Implementations can be designed that use the technologies without including the described benefits or having other benefits.

Example 4

Example Encoded Data Object Notation Persistence Format

Figure 3:
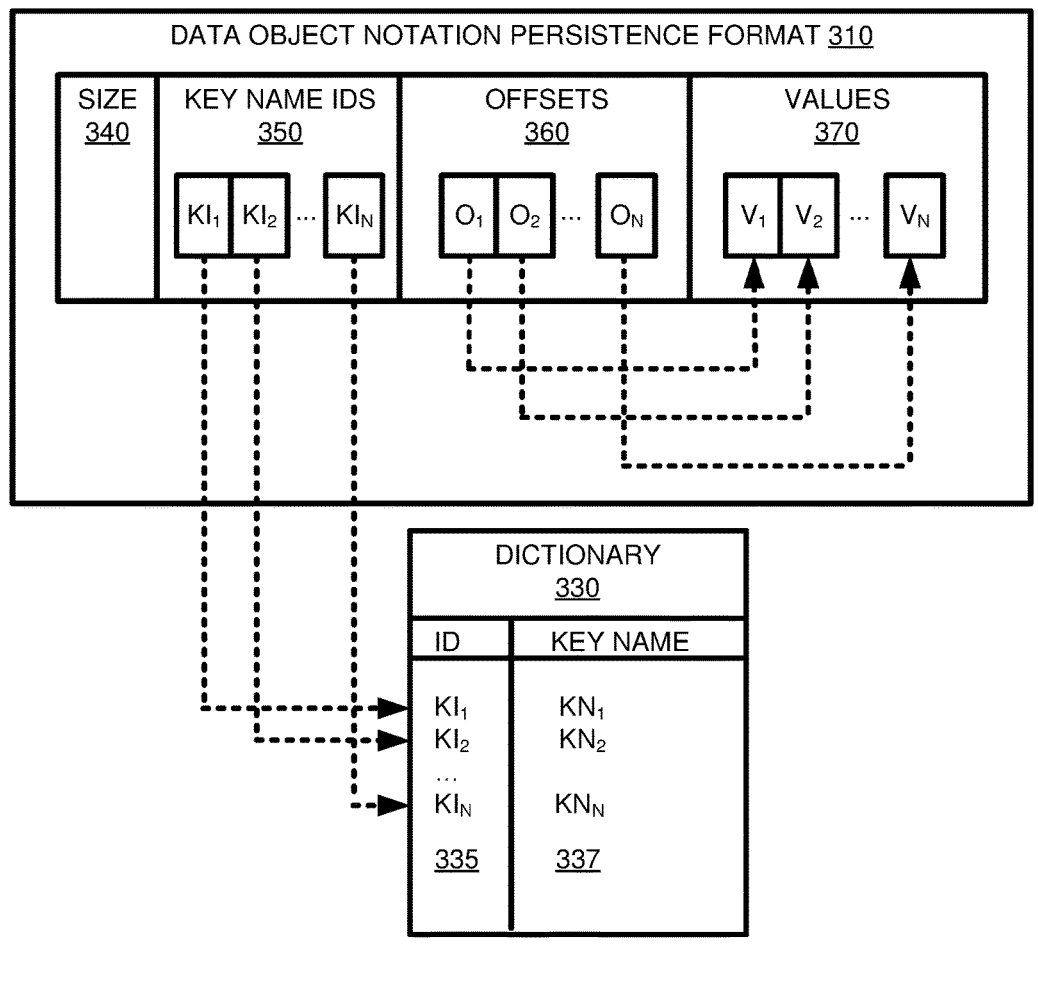
FIG. 3 is a block diagram of an example encoded data object notation persistence format.

FIG. 3 is a block diagram of an example encoded data object notation persistence format 300. In the example, a data object is represented in an encoded form 310 comprising a size 340, key name identifiers 350, offsets 360, and values 370. A dictionary 330 stores key name identifiers 335 and key names 337.

The size 340 can include information about the size of the represented data object (e.g., when it is in encoded form). For example, the size 340 can include a count of (e.g., how many) key name-value pairs are in the encoded object. A total size (e.g., in bytes) of the encoded object can also be included to indicate where the object ends.

A header can be included as a type marker (e.g., type identifier) to indicate that the type of the represented item is "encoded object," "compressed object," or the like. For example, one or more bytes can so identify the encoded object.

The key name identifiers $KI_1$-$KI_n$ 350 can be implemented as a scalar type (e.g., integer or the like) and serve as indexes into the key name dictionary 330 to indicate key names for the encoded object. A single key name identifier can be re-used as needed to represent a recurring key name. Such a representation can result in numerous benefits, including reduction in storage space, ability to more quickly search for matches, ability to more quickly determine whether a key name is present, or the like.

The dictionary 330 represents key name identifiers 335 and their respective key names 337. In practice, the identifier 335 need not be explicitly stored in the dictionary 330. For example, the identifier 335 can be an index into the dictionary 330.

The offsets 360 can point to the values 370, which in practice can be implemented as value blocks as described herein.

The same index subscript in the format 310 (e.g., key name identifier index subscript, offset index subscript, and value index subscript) can be used to represent a single key name-value pair. For example, a first key name-value pair is represented by $KI_1$, $O_1$, and $V_1$. The key name identifier index, offset index, and value index can appear in the same order (e.g., the first key name identifier index, the first offset index, and the first value index are for the same, first key name-value pair) and thus be associated with each other. Thus, if the key name identifiers are of a same, fixed size and the offsets are of a same, fixed size, it is possible to quickly perform various operations on the encoded data object.

For example, traversing through the key name-value pairs can be achieved by stepping through the key name identifiers 350 and offsets 360 without regard for the size or content of the values 370.

In practice, complex data objects can be represented, including nested data objects, and the like.

Although some subscripts are shown counting up from "1," in practice, a representation may use "0" as the first index or numbering convention. Internally, the subscript can be implied (e.g., by order, such as the first item being 1, the second item being 2, and the like).

Additional information can be included in the format as desired. For example, a header, format version number, or the like can be included as appropriate.

Example 5

Example Implemented Encoded Data Object Notation Persistence Format

Figure 4:
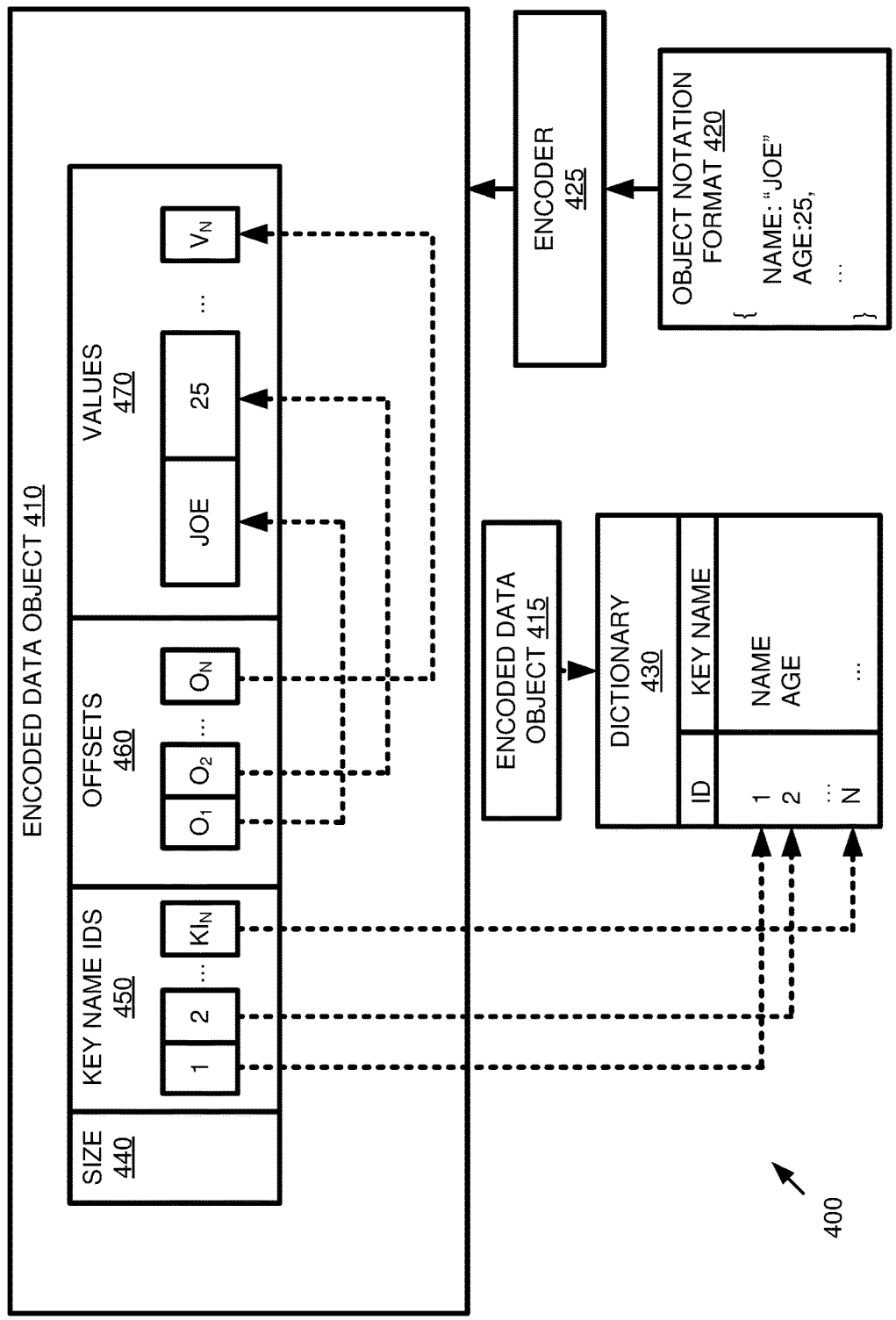
FIG. 4 is a block diagram of an example implemented encoded data object notation persistence format showing example input data object and the resulting encoded data object.

FIG. 4 is a block diagram of an example implemented encoded data object notation persistence format 400 showing example input data object 420 and the resulting encoded data object 410.

In the example, two key name-value pairs (NAME/JOE and AGE/25) are shown in an input data object 420 to an encoder 425, which generates the encoded data object 410, which follows the format shown in FIG. 3.

Other encoded data objects 415 in a collection of encoded data objects can use the same dictionary 430. As a result, other representations of the key name "AGE" in other encoded data objects can simply use the key name identifier (i.e., an integer 2) in place of "AGE." Therefore, searching the collection for matches to the key name "AGE" simply involves searching for matches to the encoded key name (i.e., the integer 2), which is computationally more efficient than matching strings.

In the example, a size 440 can indicate the number of key name-value pairs (e.g., N), and the key name identifiers 450 take index values "1" and "2," which point into the dictionary 430 to represent "NAME" and "AGE" respectively. The offsets 460 account for the size of the values "JOE" and "25" so that ready reference can be made to the value blocks 470. In practice, "25" may be a binary representation instead of a string as described herein.

In any of the examples herein, persistence can be achieved by storing the object (e.g., for later use).

Example 6

Example Value Block

In any of the examples herein, the encoded format can store type information describing data types of values stored for respective key names. One example implementation of storing type information is to store a value block representing a value. In any of the examples herein, values can be represented as respective value blocks.

Figure 5:
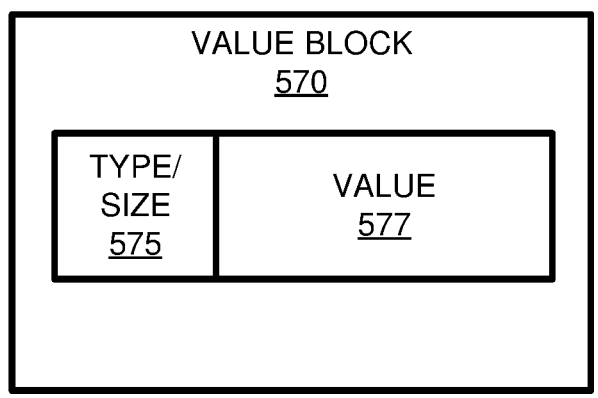
FIG. 5 is a block diagram of an example value block for inclusion in an encoded data object.

FIG. 5 is a block diagram of an example value block 570 for inclusion in an encoded data object and can be used in any of the examples herein to represent a value (e.g., V1, V2, etc. in FIGS. 3 and 4).

For a given value, the value block can comprise a field indicating a data type of the value, and the value itself. A size of the value can also be included, the type can incorporate a size as described, or both. In practice, for a given value, the value block can comprise a type field 575 that indicates a data type and/or size of the value, and the value proper 577. For example, a short string can be represented using a type of "S3" (i.e., string of 3 bytes, where a representation of the size "3" is included in the stored data type of the value block) and a value of "JOE." An integer 25 can be presented using a type of "UI8" (i.e., unsigned 8-bit integer) and an unsigned integer representation of 25.

Thus, the values in an encoded version of the data object can include binary representations of data that appear as text in the uncoded version.

A wide variety of types can be represented so that any data object can be represented using the encoded format. Any of the types described herein can be represented, and a type identifier as described herein can be used to identify the type. Example data types include integer, float, null, array, date, string, object (for nested objects), and the like.

An advantage of having ready access to type information is that queries can be optimized as described herein. However, other or additional advantages are possible.

Example 7

Example Method of Encoding Data Object

Figure 6:
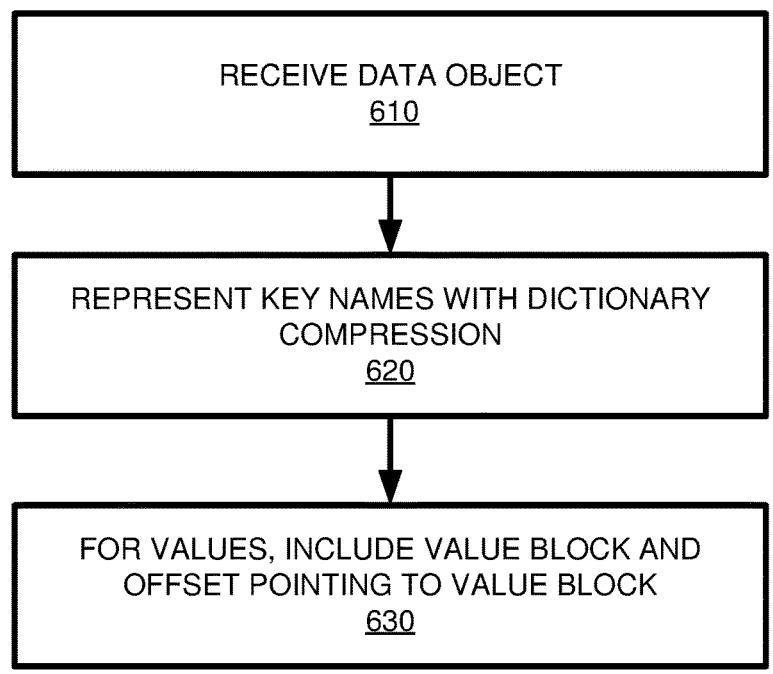
FIG. 6 is a flowchart of an example method of encoding a data object into encoded data object notation persistence format.

FIG. 6 is a flowchart of an example method 600 of encoding a data object into encoded data object notation persistence format and can be implemented, for example, in the system shown in FIG. 1 to achieve the encoded format shown in FIGS. 2, 3, and/or 4.

At 610, a data object is received. Such a data object is typically in uncoded (e.g., ASCII) form, but other forms (e.g., other or intermediate codings) can be accepted. The data object can be represented by data object notation comprising a plurality of key name-value pairs. As described herein, an encoded version of the data object can be constructed.

At 620, key names of the key name-value pairs of the data object are represented with dictionary compression. If a given key name of the data object is already present in the dictionary (e.g., was encountered in another data object, was placed in the dictionary in advance, or the like), the index to the dictionary can simply be used. If the given key name is not already present in the dictionary, a new entry can be created. The index of the new entry can be used to represent the key name in the encoded object. Thus, indexes (e.g., scalar values) are included for key names in the encoded version. Thus, the dictionary serves as a key name dictionary, and the dictionary compression represents the key names with respective indexes into the key name dictionary. Respective indexes are included in the encoded version of the data object.

For values of the data object, a value block is included 630, and an offset points to the value block. Thus, for the values of the key name-value pairs of the data object, offsets are included in the encoded version. The offsets point to value blocks representing respective of the values.

The indexes into the key name dictionary are associated with the offsets. Thus, a given key name-value pair can be reconstructed by finding the key name in the dictionary and finding the value pointed to by the associated, respective offset. One example of association is to include the key name indexes in sequential order and to include the offsets in a same sequential order. The indexes can be kept separate as shown in the examples or interleaved (e.g., a key name index followed by an offset, followed by another key name index, etc.).

Other items can be included in the encoded format as described herein. For example, a size, header (e.g., with size), or the like can be included.

The generated encoded data object can then be provided (e.g., stored) for use in a collection of encoded data objects, which can be searched, queried, transported, and the like as described herein.

The method 600 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 610 "receive data object" can also be described as "send data object."

Example 8

Example other Method of Encoding Data Object

Figure 7:
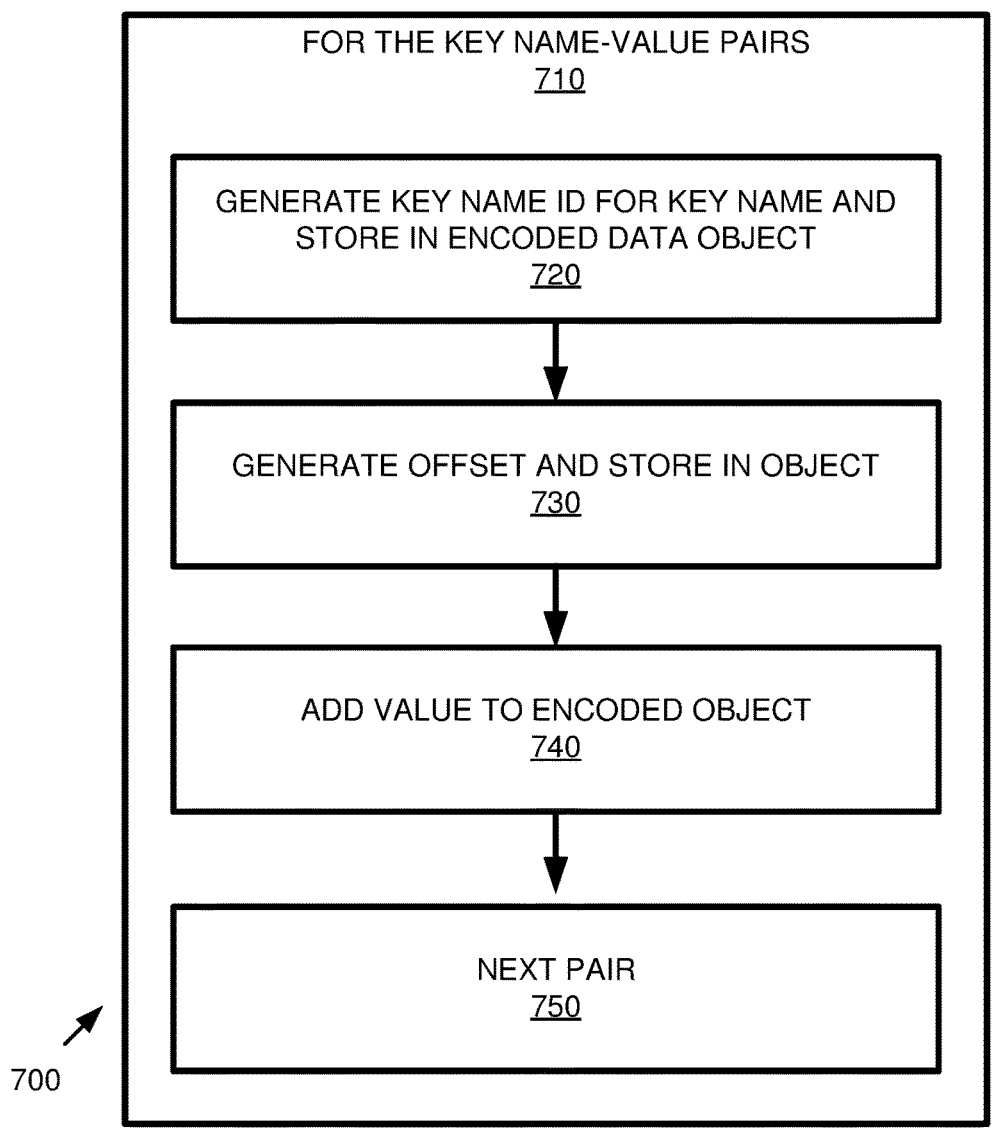
FIG. 7 is another flowchart of an example method of processing key name-value pairs when encoding a data object into encoded data object notation persistence format.

FIG. 7 is a flowchart of an example method 700 of encoding a data object into encoded data object notation persistence format and can be implemented, for example, in the system shown in FIG. 1 to achieve the encoded format shown in FIGS. 2, 3, and/or 4. The method 700 shows the iterative nature of encoding over a plurality of key name/value pairs.

In the example, iterating through the key name-value pairs 710, for a given key name/value pair, a key name identifier is generated for the key name and stored in the encoded data object 720 (e.g., a key name identifier is re-used or a new one created as described herein).

At 730, an offset is generated (e.g., based at least on sizes of any preceding values in the encoded data object) and stored in the encoded data object for the given key name/value pair.

And, at 740, for the given key name-value pair, the value is added to the encoded object. For example, a value block can be generated to indicate the type of the value, and the value itself can be stored as part of the value block.

At 750, iteration can continue for other key name-value pairs.

Example 9

Example Data Object

In any of the examples herein, a data object can take the form of one or more key name-value pairs. In practice, a key name is sometimes called an "attribute," "key value," "value of a key," or simply "key."

The data objects represented herein (e.g., in a collection) can be of a schema-less nature. In other words, relational database conventions of forcing the same keys to have the same type need not be followed. For example, a key name "age" may have values in some data objects that are of type string, while other values on other data objects (or indeed within the same data object) can be of type integer. Such an arrangement is also sometimes called "self-describing" or "semi-structured" because of the lack of a schema which defines detailed structure for the objects.

Thus, if an encoded version of a data object is one of a plurality of encoded data objects in an encoded data object collection, the encoded data objects can comprise a first key name-value pair with a value of a first data type and a second key name-value pair with a same key name as the first pair and a value of a second data type different from the first data type.

Such mixed types can be accounted for by code processing the data objects. As described herein, type tracking can be used to optimize code generation when processing the encoded data objects as described herein.

Supported types can include string, number (e.g., integer, float, and the like), object (e.g., nested), array, Boolean, null, and the like.

The schema-less nature can also be exhibited in that a key name present in one data object need not be present in another (e.g., the field is missing from at least one object in a collection of data objects).

Example 10

Example Object Notation

In any of the examples herein, an example object notation (or "data object notation") can represent data objects and thus comprises one or more key name-value pairs. In practice, such data objects comprise a plurality of key name-value pairs that are represented via the notation. In conventional (e.g., uncoded) object notation format, such key names are represented in text (e.g., ASCII, Unicode, or the like). However, as shown herein, key names can be represented in encoded form as an index into a dictionary when the data object is encoded. An example of an object notation format that is in widespread use is JavaScript Object Notation (JSON); however, the technologies described herein can be used on other object notations to advantage.

In any of the examples herein, an uncoded lightweight data object notation (e.g., JSON and the like) can be used as the basis for the encoding. A lightweight data object notation can list key names only one time per key name invocation, rather than using tags at the beginning and end of the invocation, such as is done in XML.

Nestable data objects can be supported.

Although conventional data object notation representations store data objects as text-only (e.g., ASCII, Unicode, or the like) documents, the encoded versions herein can include binary representation components (e.g., indexes, types, and values in binary format). Such a binary format can result in more efficient processing as described herein.

Example 11

Example Key Name Identifiers

In any of the examples herein, a key name identifier can be implemented as an index into a dictionary of key names. In practice, such an index can take the form of a scalar value (e.g., integer or the like) or any other value that is easily compared (e.g., with a single operation). String values are typically avoided due to the computationally-intensive nature of comparing strings.

Example 12

Example Key Name Dictionary

In any of the examples the indexes to the dictionary (e.g., encoded key names) can take the form of a scalar (e.g., integer or the like) value. Typically, such values can be more efficiently compared and processed than the strings (e.g., text key name) that they represent. Thus, comparisons for any of a variety of scenarios (e.g., searching, querying, and the like) can be implemented more efficiently as described herein.

A collection of encoded data objects can share a dictionary. The number of key names that can be represented by the dictionary can depend on the size of the index (e.g., how many bits are used for the index). In practice, it may be advantageous to partition collections so that the number of unique key names is kept low (e.g., lower than the maximum number representable by the index). The dictionaries are then shared by the respective encrypted data object collections.

Although examples show a large number of encoded data objects in a collection, it is possible that an object has its own dictionary. Such an implementation can be advantageous for exceptionally large objects that have many key name-value pairs.

Example 13

Example Encoded Data Object Size

In any of the examples herein, a size can be included in the encoded format. The size can indicate a total size of the data object (e.g., in bytes), a number of key name-value pairs (e.g., how many key name-value pairs are encoded in the data object), or the like.

Example 14

Example Search Scenario

Figure 8:
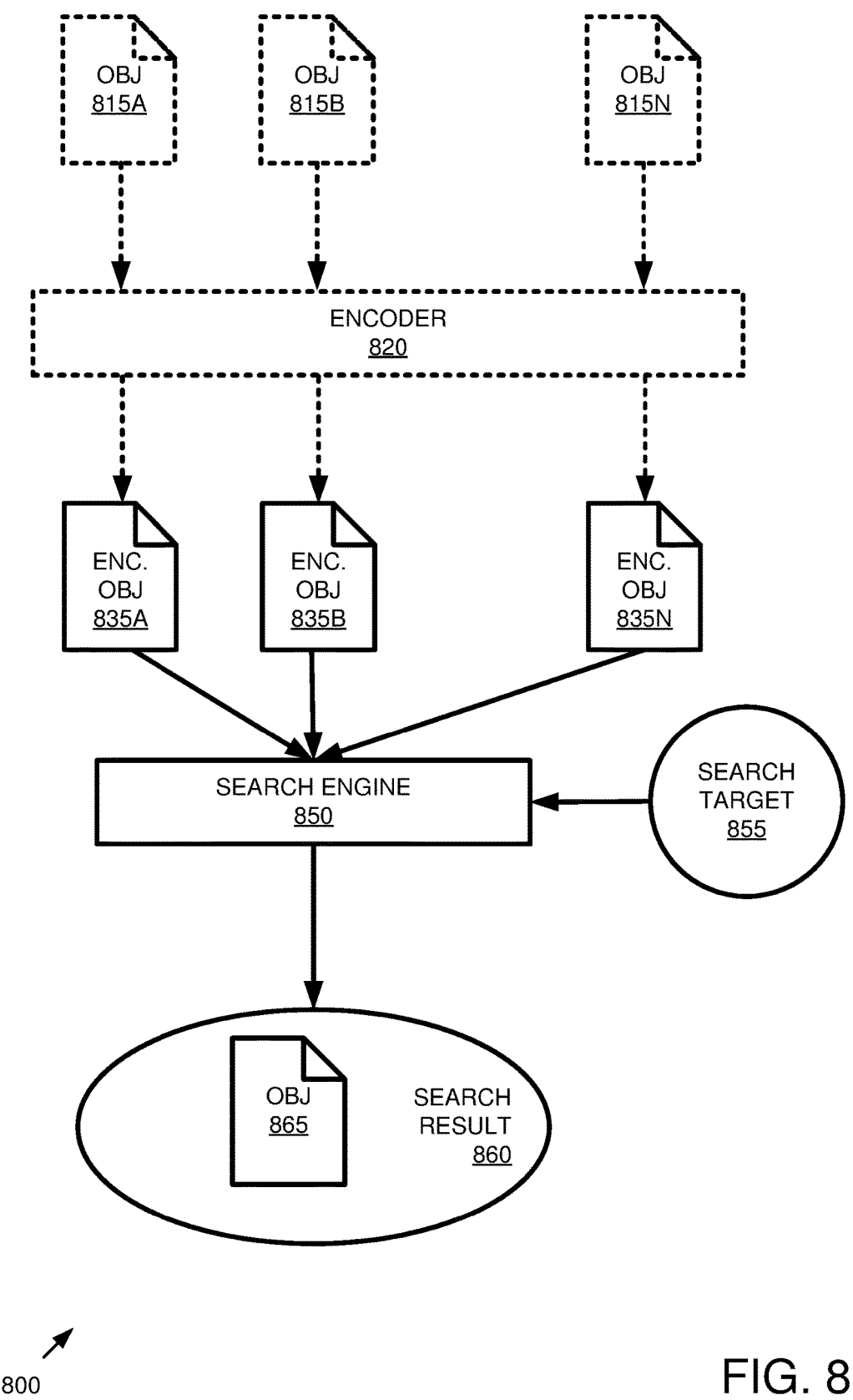
FIG. 8 is a block diagram of an example search scenario implementing an encoded data object notation persistence format.

In any of the examples herein, a search scenario can be applied to encoded data objects. FIG. 8 is a block diagram of an example search scenario 800 implementing an encoded data object notation persistence format.

In the example, a plurality of data objects 815A-N are encoded with an encoder 820 to a plurality of respective encoded data objects 835A-N. In practice, such objects can be encoded at different times by different encoder instances, a group encoding process can be employed, or the like. In systems that process data objects in a document container, data objects in such documents can be encoded in a similar fashion.

In the example search scenario, a search target 855 (e.g., target key name) is input to a search engine 850, which searches the collection of encoded objects 835A-N to find those objects 865 that contain the search target 855, which are returned as search results 860. Such results can be provided as an indication of matching objects (e.g., a pointer to the data object or the data object itself, whether coded or uncoded).

To achieve its functionality, the search engine 850 can encode the search target (e.g., encode the key name according to the dictionary), and iterate over the encoded data objects, searching for matches of the encoded search target in the encoded data objects. Any matches can be added to the search results 860. Depending on the search scenario, searching can then stop (e.g., because a match was found), or continue (e.g., because multiple matches are desired). Parallel processing, concurrent processing, work sharing, partitioning, and other technologies can be applied to improve performance as desired.

A simplified version of search results is to simply return the values for the key name (e.g., because the key name was already known). However, the entire data object may be returned in some search scenarios (e.g., to inspect other values for other key names, to add the data object to a sub-collection, or the like).

Any number of other search scenarios are possible (e.g., receiving a given object, and searching for a key name within the given object, or the like).

Example 15

Example Search Method

Figure 9:
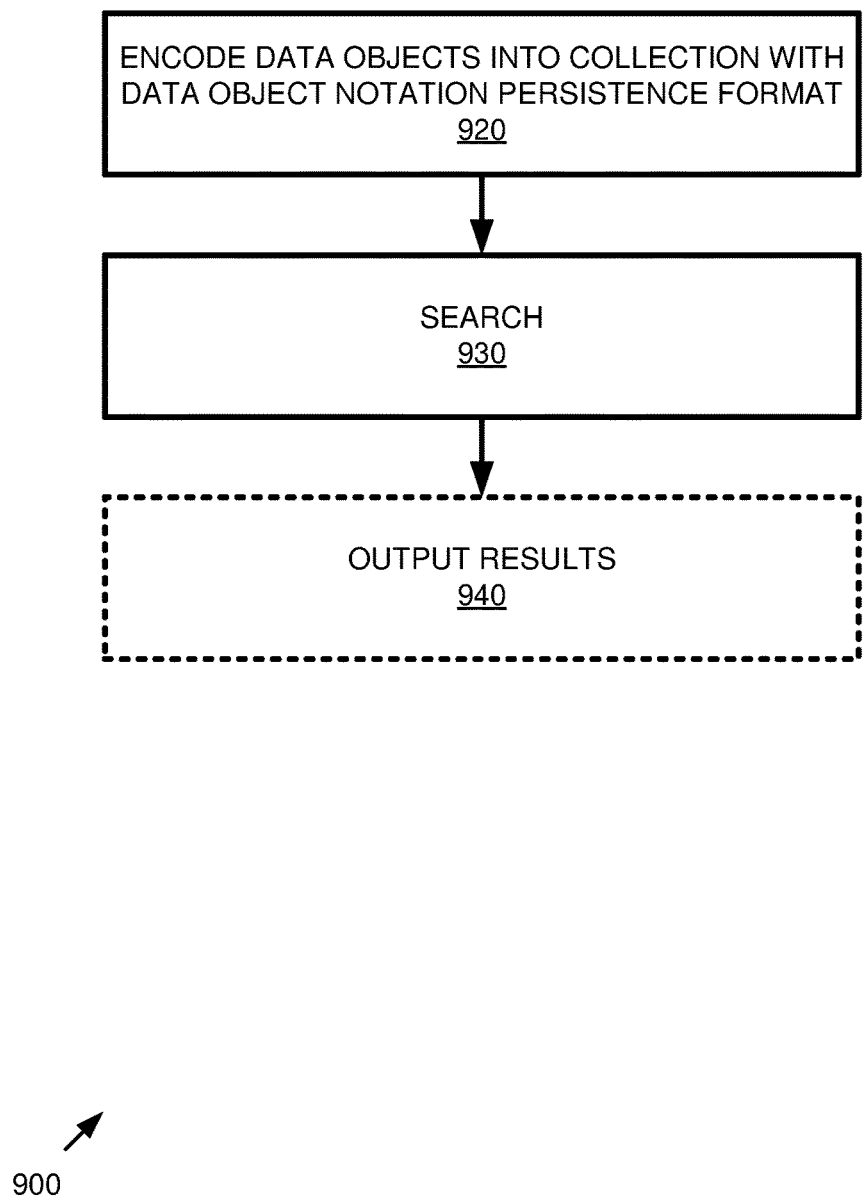
FIG. 9 is a flowchart of an example method implementing an encoded data object notation persistence format in a search scenario.

In any of the examples herein, a search method can be applied to encoded data objects. In the example, an encoded version of a data object is one of a plurality of encoded data objects in an encoded data object collection. FIG. 9 is flow chart of an example method 900 implementing an encoded data object notation persistence format in a search scenario and can be used in any of the examples herein.

At 920, data objects are encoded into a collection with data object notation persistence format as described herein.

At 930, a search is performed. For example, a target key name can be received, and searching can proceed iteratively over encoded data objects in the collection.

At 940, results are output. For example, the found data objects or references to them, whether encoded or uncoded can be provided.

Example 16

Example other Search Method

Figure 10:
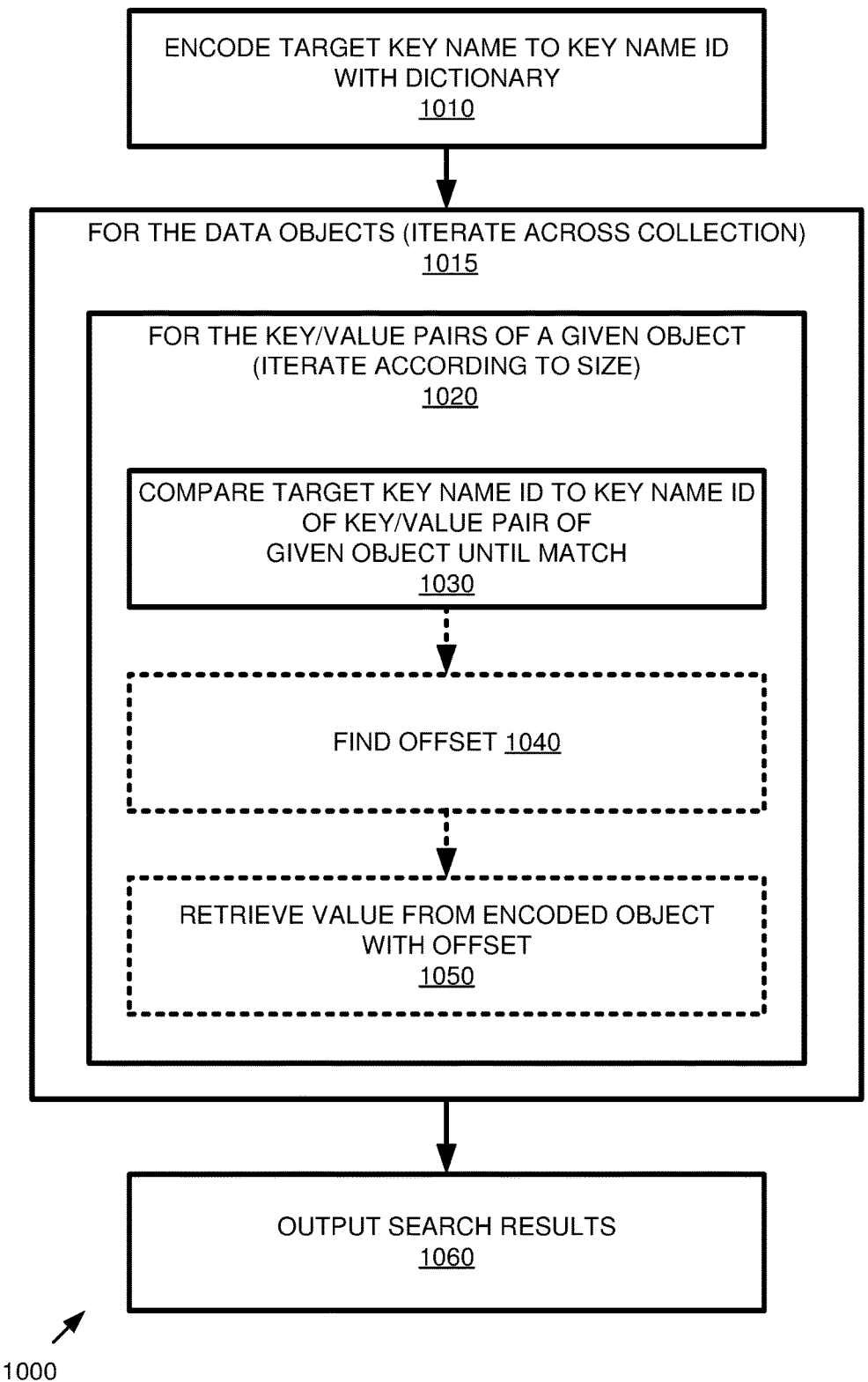
FIG. 10 is a more detailed flowchart of an example method implementing an encoded data object notation persistence format in a search scenario.

FIG. 10 is a more detailed flowchart of an example method 1000 implementing an encoded data object notation persistence format in a search scenario and can be used in any of the examples herein. In the example, a search for a given key name is shown; however, other scenarios can be employed.

A target key name can be received for the search.

At 1010, the target key name is encoded to a key name identifier with the dictionary. So, the dictionary can be searched for the uncoded key name, and the index for the dictionary entry having the uncoded key name can serve as the key name identifier. Note that if the key name is not found in the dictionary, the search results are empty, and a considerable performance benefit has been realized. In such a case, search results of "none," "empty," "null," or the like can be returned.

The method can then search the encoded data object collection for the encoded key target name. In the example, the searching comprises searching the encoded data object collection for instances of the encoded key target name appearing in the encoded data object collection. At 1015, the method iterates over the collection of data objects to be searched. In any of the examples herein, a database can store the data objects in encoded format. Such a database need not implement relational technologies because the data objects can be treated by the database as simply objects that have no relationship to each other.

At 1020, for a given encoded data object, the method iterates over the key name-value pairs. Iteration can proceed according to a size (e.g., how many key name-value pairs) stored in the encoded object or repeating until there are no more.

At 1030, the target key name identifier is compared to the key name identifier of the key name-value pair. In practice, a simple comparison of key name identifiers can be done without having to involve processing of the values. As described herein, more than one comparison can be performed at a time to achieve parallel processing. If there are no matches, then the search can proceed to the next key name-value pair of the given object.

Assuming the search is for the associated value of the target key name, if there is a match, at 1040, the offset in the encoded data object can be found, and at 1050, the value can be retrieved from the encoded object with the offset.

Alternatively, if the search is for data objects having a target value for the key name, the value can be compared to the target value, and the object can be added to the search results. The target value can be encoded in advance to assist in comparison.

Other alternatives are possible. For example, the search can be directed to any arbitrary criteria and begin to look more like a query (e.g., find all objects that have key name "age" with value between 25 and 35; find value of "age" for objects that have country="Australia"; or the like).

When accessing values in the encoded objects, the value may be decoded according to its type as indicated in the encoded data object.

At 1060, the search results are output. Search results can take the form of one or more values for a target key name, objects having a key name-value match, or the like. Decoded versions of matching objects can be provided if desired.

Example 17

Example SIMD Technique

Figure 11:
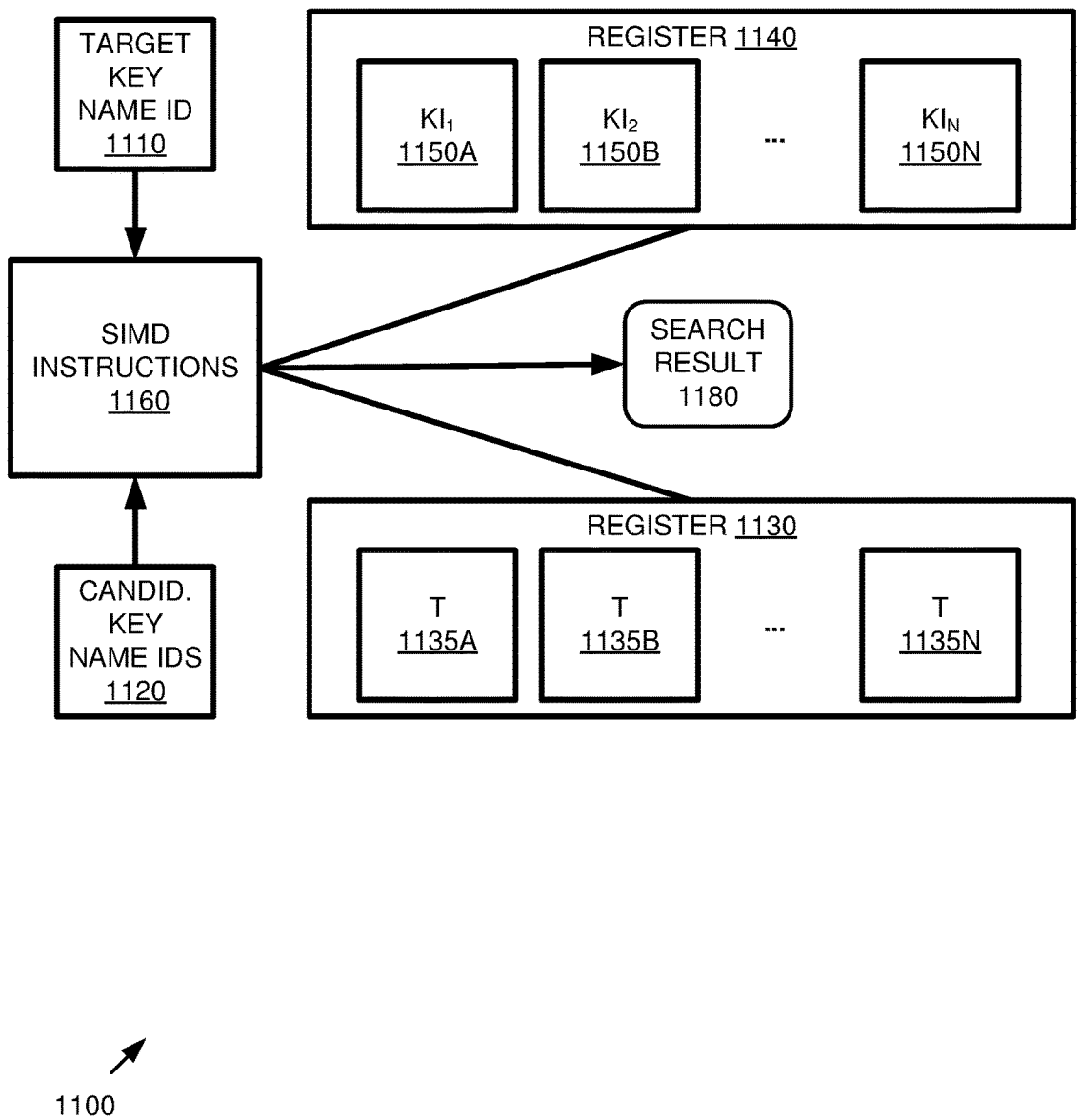
FIG. 11 is a block diagram of an example system that searches an encoded data object notation persistence format with a single-instruction-multiple-data (SIMD) processor instruction.

In any of the examples herein, search and query processing can take advantage of the encoded format by employing SIMD technology. FIG. 11 is a block diagram of an example system 1100 that searches an encoded data object notation persistence format with one or more single-instruction-multiple-data (SIMD) processor instructions and can be incorporated into any of the examples herein.

In the example, searching comprises searching for an encoded target key name with SIMD processor instructions. As shown, a target key name identifier 1110 (e.g., that identifies a key name in a dictionary) can be used as input to one or more single-instruction-multiple data (SIMD) instructions 1160 along with the candidate key name identifiers 1120 for a plurality of candidate matches. In practice, references rather than the actual values can be used. Thus, a plurality of candidate key name identifiers from a plurality of encoded key name-value pairs (e.g., for one or more encoded data objects) can be searched for matches.

Candidate matches $KI_1$ 1150A, $KI_2$ 1150B, and $KI_n$ 1150N can be loaded into a register 1140 from a memory location (e.g., storing the candidate identifiers 1120). For example, a 128-bit register may be able to hold 8 16-bit values, 4 32-bit values, or the like. The SIMD instruction can load multiple candidates in memory to the register at one time. An example instruction that can be used to load data into the register 1140 is as follows:

_m128i _mm_loadu_si128 (_m128i const*mem_addr)

The target 1110 can then be broadcast to elements 1135A-N of another register 1130 for one-time comparison with candidates. A number of different SIMD instructions can be used to broadcast depending on the target key size:

---
    _m128i _mm_set1_epi8(char a)
    _m128i _mm_set1_epi16(short a)
    _m128i _mm_set1_epi32 (int a)

---

Another SIMD instruction can then perform in-register comparison of candidates and the broadcasted target key. A number of different SIMD instructions can be used for comparison depending on the target key size:

---
    _m128i _mm_cmpeq_epi8 (_m128i a, _m128i b)
    _m128i _mm_cmpeq_epi16 (_m128i a, _m128i b)
    _m128i _mm_cmpeq_epi32 (_m128i a, _m128i b)

---

Then, another SIMD instruction can mask the comparison result and determine the location of the match, if there is one. An example is as follows:

int _mm_movemask_epi8 (_m128i a)

Upon execution of the instructions 1160, the instructions can indicate the search result 1180. If a null search result is indicated, searching and query processes can continue to quickly search through a large number of encoded data objects without regard for the actual (uncoded) key names or the associated values.

A non-null search result can be further processed as appropriate. For example, the particular key name-value pair, data object, value, or the like can easily be found.

Such a technique can be used to find matches in any of the examples herein. For example, comparing a target key name identifier to candidate key name identifiers can comprise such an SIMD method.

Due to the computational efficiencies of comparing scalar values, the described technique can result in significant performance benefits when searching or performing queries on data objects.

Example 18

Example SIMD Method

Figure 12:
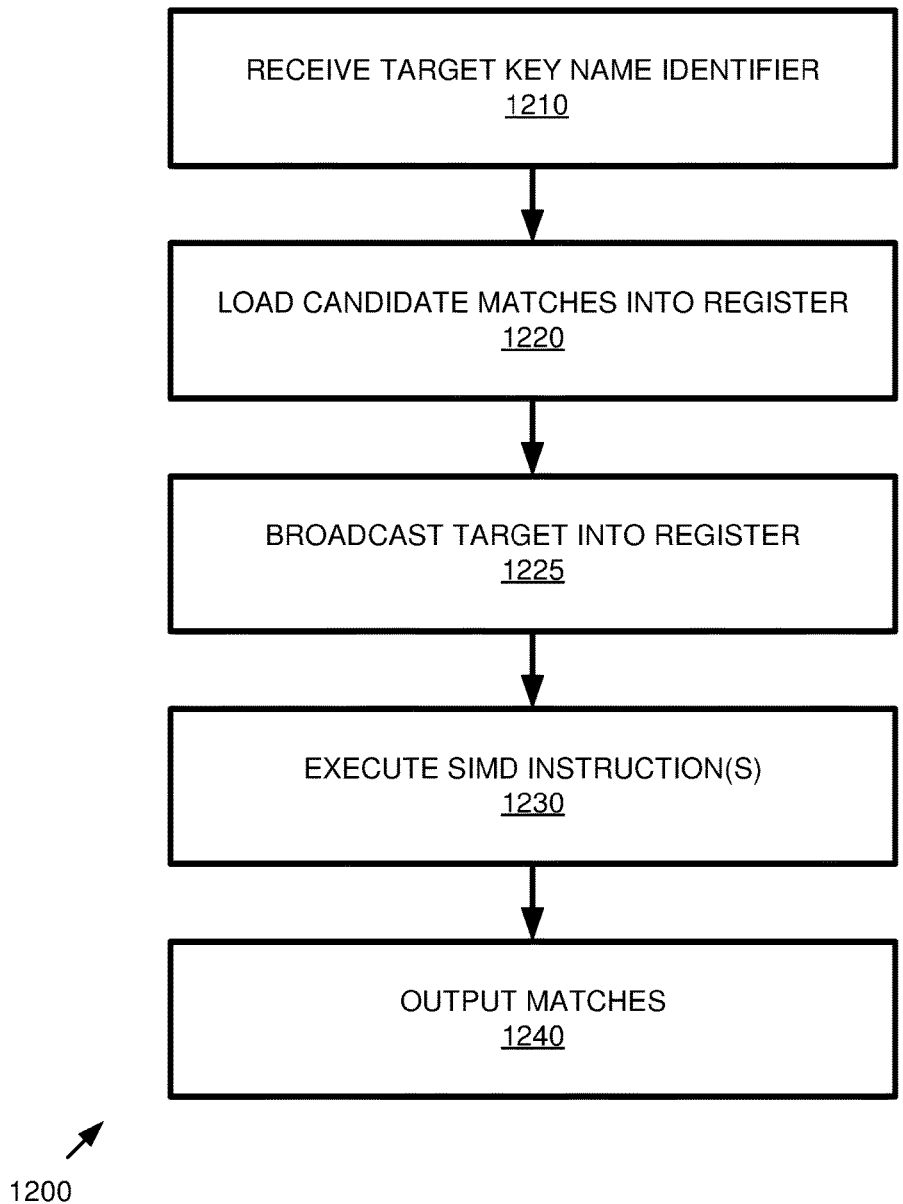
FIG. 12 is a flowchart of an example method of searching an encoded data object notation persistence format with a single-instruction-multiple-data (SIMD) processor instruction.

FIG. 12 is a flowchart of an example method of searching an encoded data object notation persistence format with a single-instruction-multiple-data (SIMD) processor instruction that can be used in any of the examples herein and can be implemented, for example, by the system of FIG. 11.

At 1210, a target key name identifier is received. For example, if the search is for a given key name, the encoded key name can take the form of an index into a dictionary that identifies the key name and be used as the target. The target key name identifier can be placed in a location appropriate for the SIMD instruction being used (e.g., memory or register).

At 1220, the candidate matches are loaded into a SIMD register. So, a plurality of encoded key names (e.g., key name identifiers) from respective key name-value pairs can be loaded from memory into the register for searching. The SIMD instructions described above can be used.

At 1225, the target key name identifier is broadcast into a SIMD register. The SIMD instructions described above can be used.

At 1230, one or more SIMD instructions are executed to determine whether there is a match between the target and the candidates. The SIMD instructions described above can be used to compare and determine the location of a match, if any.

At 1240, the matches are output. In some cases, there are no matches, and the result is null.

Subsequently, whatever search or query processing is desired can then be performed as described herein. The described method can thus be implemented as part of search or query processing to achieve parallel comparison of a plurality of key names.

Example 19

Example Stored Data Type Information

In any of the examples herein, data type information can be stored to improve performance of data object processing. FIGS. 13A-B are block diagrams showing an extended dictionary 1330 storing data type information for key names. The example shows such information incorporated into a dictionary 1330, but, in practice, type information can be stored separately, whether making use of the key name identifiers or not.

The example dictionary 1330 is shown as an extended version of the dictionary shown in FIGS. 3 and 4. The key name identifiers 1335 and key names 1337 function similarly. The identifiers 1335 need not be explicitly stored as described above.

In addition, the dictionary 1330 stores data type information 1339 for the key names 1337. Such type information 1339 can indicate the types represented for the key names 1337 in a collection of data objects that reference the dictionary 1330. The type information 1339 can take the form of a single type (e.g., "string," "integer," or the like), but can also take the value "mixed" or otherwise indicate that the types represented are mixed (e.g., at least one instance of a first type and at least one instance of a second, different type). A single identifier can be used for "mixed," or identifiers indicating the actual mixed types can be stored.

The example in FIG. 13B shows a situation in which the key name "age" is associated with a string value "25" and an integer value 25. Therefore, the type information indicates "mixed." In other words, responsive to determining that more than one data type is represented for a single key name, a mixed data type indication is stored for later reference.

Such type information can be tracked when encoding, deleting, or otherwise processing data objects. For example, the types of newly encoded data objects can be checked, and the type information 1339 can be updated accordingly. As data objects age, it may be desirable to cycle older objects out of the collection, and the data type information can be updated accordingly by checking data types of the remaining data objects and tracking such data types going forward.

Example 20

Example Query Optimization Method with Stored Data Type Information

In any of the examples herein, when generating code for a query, stored type information can be used. In the example, an encoded version of a data object is one of a plurality of encoded data objects in an encoded data object collection.

Figure 14:
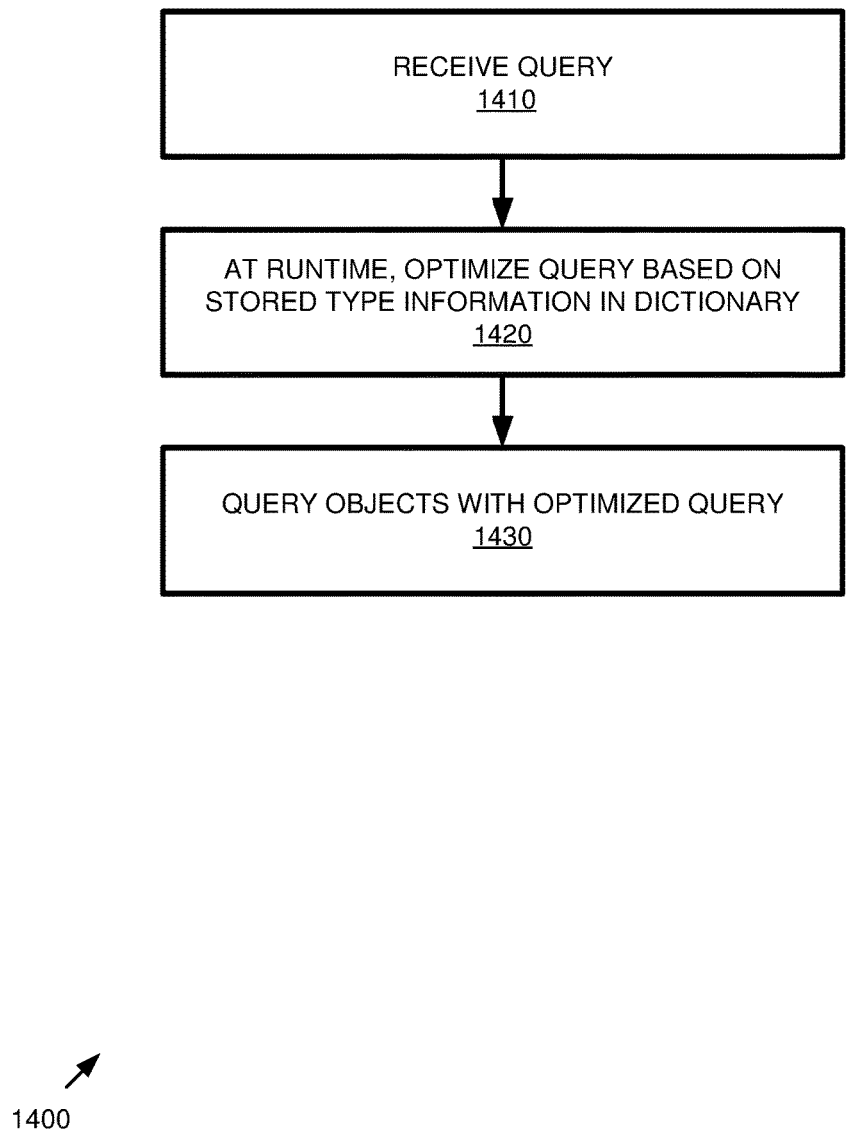
FIG. 14 is a flowchart of an example method of optimizing a query with stored type information.

FIG. 14 is a flowchart of an example method 1400 of optimizing a query with stored data type information. The method 1400 relies on the data type information stored as shown in FIG. 13.

At 1410, a query for the encoded data object collection is received. Such a query can include references to key names for which data type information has been tracked.

At 1420, at runtime, the query is optimized based on stored type information (e.g., in a dictionary) as described herein. Code generation for such queries can proceed in light of the tracked type information. For example, code may ordinarily be included to handle mixed type scenarios (e.g., to deal with a situation in which objects may have different value types for the same key by checking, for example, in an addition that both operands have numeric type); however, if the tracked data type information indicates that the data is all of one type, then such code can be omitted.

For example, in aggregation or comparison functions, it may be desirable to convert string data to integer or other scalar values for mathematical operations (e.g., compare, add, average, max, min, or the like). Code generation for the query can choose between including and not including code to check the type and convert it based on whether the tracked type information for the key name indicates that the type is mixed (or not "integer" or other numeric value). For example, when the tracked data type information indicates that the type is "integer," there is no need to check the data type or convert (e.g., from string to integer).

Thus, type checking code can be omitted responsive to determining that the stored type information indicates that a target key name has only data types in the encoded data object collection that do not necessitate type checking (e.g., all the values are of type "integer"; all the values are of the same type, etc.).

Considerable performance improvement can result. Exception checking code can also be eliminated (e.g., if it is known that none of the data is a particular type that throws the exception). For example, when adding values, exception checking code that checks for strings can be omitted if the stored type information indicates that no strings are present (e.g., all are of type "integer"). On the other hand, if the type is "mixed" or if type "string" is indicated, such exception checking code can be included.

Code generation can be optimized by eliminating branches, using inline virtual functions, and the like. Inner loop functions can be optimized, which can increase performance because such loops are typically executed for each data object. Other optimizations include parsing optimization.

At 1430, the collection of data objects is queried using the code generated for the optimized query. Thus runtime optimization of the query can be achieved via the tracked type information.

Thus a runtime-determined schema describing semi-structured data that is typically schema-less can be used to optimize processing of the data.

In another feature, a NULL type or non-existing key names can be tracked. For example, NULL can be a recognized type, and if the tracked data type information indicates "NULL," it is known that all of the key names have the value of "NULL," which can be used to advantage when generating code for the query.

Similarly, if a key name does not appear in the list of tracked data type information, the tracked data type information indicates that there are no instances of the key name in the encoded data object collection. Therefore, the query can instantly return an appropriate result based on the non-existence of the key name. Optimizing the query can include checking the stored type information to determine whether there are any values for a given key name.

Such an approach can result in considerable performance gains for queries over encoded data object collections.

Example 21

Example Decoding Method

Figure 15:
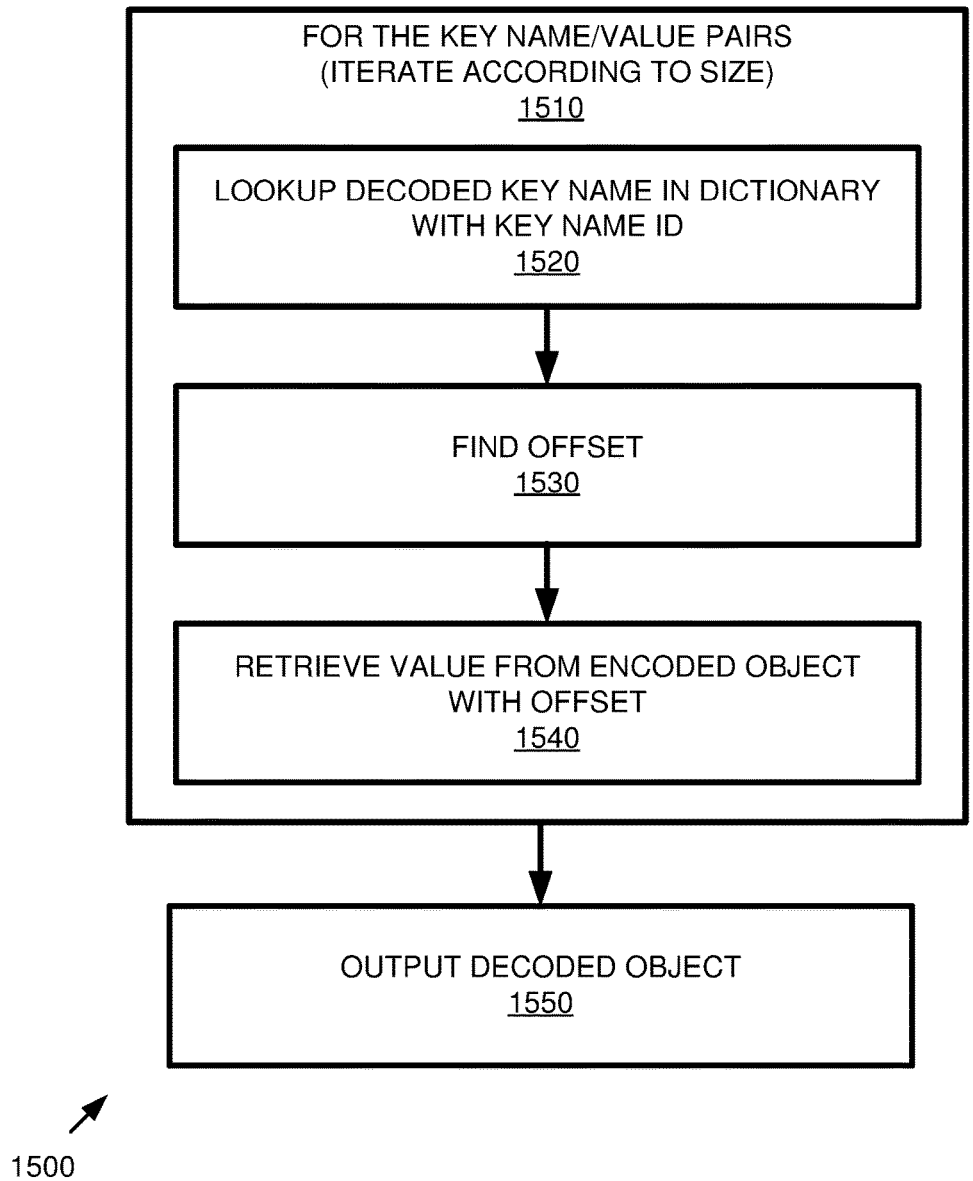
FIG. 15 is a flowchart of an example method of decoding an encoded data object.

FIG. 15 is a flowchart of an example method 1500 of decoding an encoded data object and can be used to decode any of the encoded data objects described herein.

A given encoded data object is received. Initial processing can include determining that the object is of an encoded type (e.g., by checking a header of the object), determining the size (e.g., how many key name-value pairs are present), and the like.

At 1510, the process can iterate over the number of key name-value pairs.

At 1520, for a given key name-value pair, the decoded key name can be looked up in the dictionary with the key name identifier, which can serve as an index into the dictionary.

At 1530, the offset for the value location of the given key name-value pair can be found.

At 1540, the value for the key name-value pair can be retrieved from the encoded object with the offset. In implementations using a value block, the type information can be used to decode the value into a text format usable in the uncoded data object.

The object can then iterate over further key name-value pairs.

At 1550, the decoded object is output. For example, a JSON (e.g., text) format can be used for the decoded object.

Example 22

Example Documents

In any of the examples herein, a document can take the form of a data object notation document that stores one or more data objects as described herein. For example, if an encoded version of a data object is one of a plurality of encoded data objects in an encoded data object collection representing JSON objects, the encoded data object collection can represent a plurality of JSON documents comprising respective of the encoded data objects.

Example 23

Example Semi-Structured Document Perspective

In any of the examples herein, the data object can be described from a semi-structured document perspective. A semi-structured document can take the form of one or more data objects represented by a lightweight data object notation persistence format comprising a plurality of attribute-value pairs and be represented in text form. The semi-structured nature of the document includes the characteristics that there is some structure (e.g., attributes have values), but full structure of a relational database is not imposed (e.g., types can vary, fields can be missing, and the like).

Constructing an encoded version of the semi-structured document can include receiving the semi-structured document. Then, the attributes of attribute-value pairs can be represented with dictionary compression as described herein. The dictionary compression can represent the attributes with respective scalar values as indexes into a dictionary of attributes.

A header can be included in the encoded version of the semi-structured document. The header can indicate a size of the encoded version as described herein.

For attributes of the attribute-value pairs, the process can include the respective scalar values representing the attributes in the encoded version of the semi-structured document.

For a given value out of the values represented in the attribute-value pairs, an offset can be included in the encoded version. The offset points to a block representing the value of an attribute-value pair. The block comprises a field indicating a type of the value and a field representing the actual value.

The encoded version of the semi-structured document can be output. The encoded version thus comprises a binary representation of the semi-structured document.

Example 24

Example Document Store Implementation

In any of the examples herein, processing of data object notation can be provided as a service by a document store. In such an implementation, data objects can be stored in units called "documents." Clients of the document store can add data objects to the collection of data objects in the document store, search the collection of data objects in the document store, query the document store, and the like without regard to the encoded nature of the data object notation persistence format.

The document store can handle full ACID transactions, joins (e.g., collection to collection, collection to table, or the like), multitenant scenarios, and the like. A SQL-like syntax can be used. Scaling can be supported to the petabyte range, and the store can be implemented on commodity and server hardware.

From the perspective of clients, the document store can process documents in a standard format, such as JSON, but the underlying representation can take advantage of the encoding technologies described herein. Complex documents can be stored as arrays, integers, objects, and any other data supported by the standard format.

When documents are stored in collections, they are analogous to database tables in a relational database management system, even if the documents do not adhere to relational database principles. Similarly, documents can be analogous to rows or records. Thus, traditional operations such as queries, inserts, and the like can be used so that clients accessing the document store can take a familiar form. For example, "SELECT" syntax can be supported (e.g., "SELECT*FROM users WHERE age=33 ORDER BY name"). Nested types can use the dot (".") operator. Inner fields can be accessed (e.g., students.address.city).

An SQL extension can support arrays, and arrays can have a consistent order (e.g., array[index] returns the same element at different times). An example array access can be "students.phoneNumber[1].number."

Another SQL extension can account for missing fields by adding the "missing" keyword. For example "IS MISSING OPERATOR" or "MISSING !=NULL."

In practice, more than one collection can be implemented in an underlying database that handles logistics for retrieving and managing data storage.

The schema-less nature of the document store can make it very flexible. Fields can be added or removed to any document. Key names in one document need not be present in another (e.g., there are missing fields). The store can scale well horizontally, which is advantageous for big data processing. The store can still provide ACID properties.

Example 25

Example JSON Implementation in Web Environment

Figure 16:
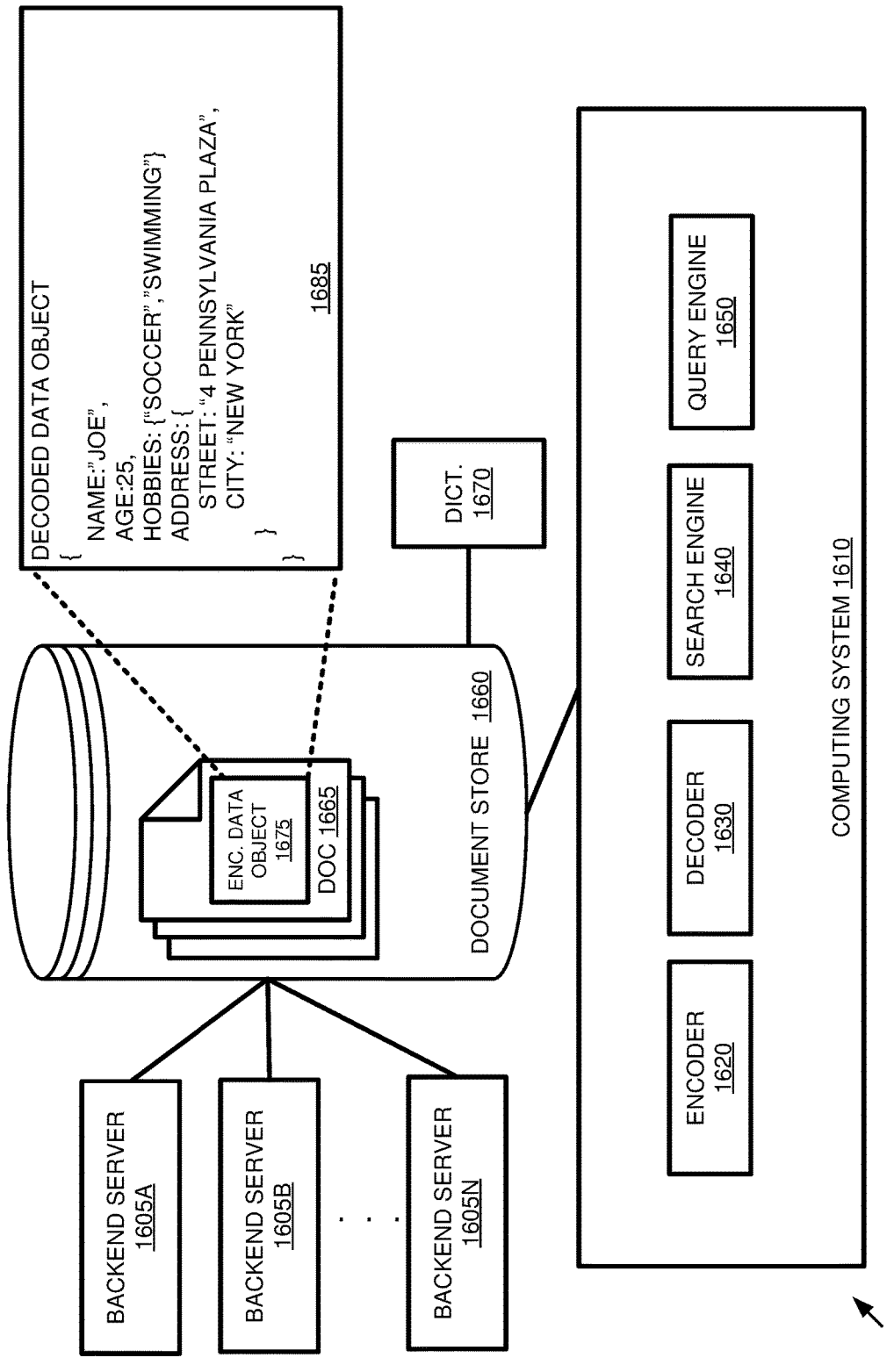
FIG. 16 is a block diagram of an example system implementing encoded JSON data objects in a web site environment.

FIG. 16 is a block diagram of an example system 1600 implementing encoded JSON data objects in a web site environment. In the example, a plurality of backend web servers 1605A-N fulfill requests for web pages from a plurality of clients equipped with web servers (not shown). As part of processing, the backend servers 1605A-N and the clients exchange semi-structured data in the form of JSON documents containing data objects 1685. The data objects can be encoded and stored in a document store 1660 as encoded data objects 1675 and thus effectively represent encoded JSON documents 1665 in the document store 1660. The encoded format can include a binary representation of JSON objects. As shown herein, a dictionary 1670 can be used as part of the encoding features. In practice, there can be multiple dictionaries (e.g., different dictionaries) shared by respective document collections.

Access to the document store 1660 can be provided to so that the encoding process is transparent to accessing systems, such as the backend web servers 1605A-N, other systems 1610, analytics systems, and the like. An encoder 1620, decoder 1630, search engine 1640, and query engine 1650 can integrate the encoded data object notation persistence format described herein.

Example 26

Example Memory Layout

In any of the examples herein, the data for a data object can be laid out as shown. For example, a physical arrangement of the data can take the illustrated form. Similarly, when the data object is transported, the data can be arranged as shown. Such an arrangement can result in faster processing, less memory, less bandwidth, or the like.

Example 27

Example Database Management System

In any of the examples herein, a database management system can take the form of a system that provides database management services. In practice, such a system is typically provided as a server providing services to a plurality of requesting clients.

Such a system can include an SQL engine that implements execution of SQL queries and other SQL operations. Queries can be optimized as described herein.

Example 28

Example JSON Implementation Details

In any of the examples herein, the format can be varied. A binary representation of JSON can be implemented as a first byte indicating that the represented item is a data object. A fixed number of bytes (e.g., 4 or the like) can indicate a size of the object.

When representing types, a short string optimization can be used to combine a type and size into a single byte (e.g., string of size 4 is represented in a single byte).

Example 29

Example Block Notation Implementation

In any of the examples herein, a block notation can be used to describe the encoding. Key names and values can generically be called "items." Such items can be assigned a marker. The markers can be enclosed in brackets ([and]). Value and containers can have types and corresponding markers. Markers can be replaced by a decimal value as shown below:

TABLE 1

Value types for Item values (Key names or values)

| Marker | Type | Value (Type Identifier) |
|---|---|---|
| Z | null | 0 |
| i | int8 | 10 |
| U | uint8 | 11 |
| I | int16 | 12 |
| l | int32 | 13 |
| L | int64 | 14 |
| d | float32 | 15 |
| D | float64 | 16 |
| T | True | 30 |
| F | False | 31 |
| { | Object | 40 |
| [ | Array | 50 |
| O | ObjectID | 60 |
| s | String | 70 |
| V | ValueID | 80 |
| t | Date | 90 |
| S | String | 127-255 (size is also encoded) |

A length type can be used internally to efficiently store length values like the number of elements in an Array or Object. So, it can be included as part of an outer type such as an array or object.

TABLE 2

Length

| Type | Size | Marker | Marker Value | Length | Data Payload |
|---|---|---|---|---|---|
| Size | 1-4 byte | N | No | No | No |

In the example, the length type can represent values in the range of $0-(2^{30}-1)$. The two most significant bits of the first byte can determine how many bytes are used to represent the value. Up to four bytes are possible in the example. The value is then stored in the remaining 6-30 bits. In practice, other sizes can be used.

TABLE 3

Length encoding

| 2 MSB | Size | Possible Values |
|---|---|---|
| 00 | 1 byte | $0 - (2^6 - 1)$ |
| 01 | 2 bytes | $0 - (2^{14} - 1)$ |
| 10 | 3 bytes | $0 - (2^{22} - 1)$ |
| 11 | 4 bytes | $0 - (2^{30} - 1)$ |

The null value can be defined as follows:

TABLE 4

Null

| Type | Size | Marker | Marker Value | Length | Data Payload |
|---|---|---|---|---|---|
| Null | 1-byte | Z | 0 | No | No |

The null value in the encoded version can be equivalent to the null value from the object notation.

Example Encoding:

For the following object notation:

```
{
    "value" : null
}
```

The following block notation can be used:

[S-5][value][Z]

Thus, for a key name-value pair, the block notation represents the key name, followed by the value for the key using the size and data type conventions described above.

Boolean types can be defined as follows:

TABLE 5

Boolean

| Type | Size | Marker | Marker Value | Length | Data Payload |
|---|---|---|---|---|---|
| True | 1-byte | T | 30 | No | No |
| False | 1-byte | F | 31 | No | No |

The Boolean type can be represented in the encoded format similar to the object notation persistence format (e.g., using T (true) and F (false) character marker.

Example Encoding:

For the following object notation:

```
{
    "ok" : true
    "error": false
}
```

The following block notation can be used:

[S-2][ok][T]
[S-5][error][F]

In the example, 7 numeric types are defined for the encoding as follows:

TABLE 6

Numeric Types

| Type | Size | Marker | Marker Value | Length | Data Payload |
|---|---|---|---|---|---|
| int8 | 2-bytes | i | 10 | No | Yes |
| uint8 | 2-bytes | U | 11 | No | Yes |
| int16 | 3-bytes | I | 12 | No | Yes |
| int32 | 5-bytes | I | 13 | No | Yes |
| int64 | 9-bytes | L | 14 | No | Yes |
| Float32 | 5-bytes | d | 15 | No | Yes |
| float64 | 9-bytes | D | 16 | No | Yes |

In some language implementation related to object notations (e.g., JavaScript for JSON), the Number type can represent any numeric value, but multiple different numeric types can be implemented to describe different sizes and types of numeric values, allowing the runtime to handle numeric operations more efficiently.

A single numeric type can be implemented in the encoding, but typically increases parsing complexity. Different numeric types in the encoding can allow direct conversion into a native language type (such as Java or others) or a straightforward marshaling into the nearest-supported language type (e.g., for Erlang or others).

The different numeric types can be used to efficiently store numbers in a space and encoding-optimized format.

An example uncoded object follows:

```
{
    "int8" : 16,
    "uint8" : 255,
    "int116" : 32767,
    "int32" : 2147483647,
    "int64" : 9223372036854775807,
    "float32" : 3.14,
    "float64" : 113243.7863123,
}
```

The equivalent coded object in block notation is as follows:

```
[S-4][int8][i][16]
[S-5][uint8][U][255]
[S-5][int16][I][32767]
[S-5][int32][I][2147483647]
[S-5][int64][L][9223372036854775807]
[S-7][float32][d][3.14]
[S-7][float64][D][113243.7863123]
```

Numeric values of infinity can be encoded as a null value.
The min/max range of values (inclusive) for each numeric type can be as follows:

| Type | Signed | Min Value | Max Value |
|---|---|---|---|
| int8 | Yes | −128 | 127 |
| uint8 | No | 0 | 255 |
| int16 | Yes | −32,768 | 32,767 |
| int32 | Yes | −2,147,483,648 | 2,147,483,647 |
| int64 | Yes | −9,233,372,036,854,775,808 | 9,223,372,036,854,775,807 |
| float32 | Yes | Per IEEE 754 Spec | Per IEEE 754 Spec |
| float64 | Yes | Per IEEE 754 Spec | Per IEEE 754 Spec |

Integer types (e.g., int8, uint8, int32 and int64) can be written in most-significant-bit order (high byte written first, aka "big endian").

Float32 values can be written in IEEE 754 single precision floating point format, which is the following structure:

Bit 31 (1 bit)—sign

Bit 30-23 (8 bits)—exponent

Bit 22-0 (23 bits)—fraction (significand)

Float64 values can be written in IEEE 754 double precision floating point format, which is the following structure:

Bit 63 (1 bit)—sign

Bit 62-52 (11 bits)—exponent

Bit 51-0 (52 bits)—fraction (significand)

An ObjectID type in the encoded format can be defined as:

| Type | Size | Marker | Marker Value | Length | Data Payload |
|---|---|---|---|---|---|
| ObjectID | 1-byte + 12-byte | O | 60 | No | Yes |

ObjectID can be a 12-byte type, constructed using:

a 4-byte value representing the seconds since the Unix epoch, a 3-byte machine identifier, a 2-byte process id, and a 3-byte counter, starting with a random value.

Example Uncoded

```
{
    "id" : objectId ("577f1f66bcf36cd59f4h9415"),
}
```

Encoded Snippet in Block Notation:

[S-2][id][O]0x577f1f66bcf36cd59f4h9415]

The Date type in the encoded format can be defined as:

| Type | Size | Marker | Marker Value | Length | Data Payload |
|---|---|---|---|---|---|
| Date | 1-byte + 8-byte | t | 90 | No | Yes |

Date can be a 64-bit integer that represents the number of milliseconds since the Unix epoch (Jan. 1, 1970). This results in a representable date range of about 290 million years into the past and future. Negative values represent dates before 1970.

Example Uncoded

```
{
    "date":Date("1444207241"),
}
```

Encoded Snippet in Block Notation:
[S-4][date][t][1444207241]
The String Type can be defined as:

| Type | Size \| Marker | Marker Value | Length | Data Payload |
|---|---|---|---|---|
| String | 1-byte + N + string data len \| S | 70 | Yes | Yes, if not empty |
| String | 1-byte + string data len \| S | 127-255 | Yes, in marker | Yes, if not empty |

There can be two different ways to store strings. For short strings (len<128) one can use the MSB in the marker to identify the string. The remaining 7 bits are then used to encode the strings length. So for short string one can use 1-byte to store the marker and the length of the string.
Example
Uncoded:

```
{
    "value" : "short",
}
```

Encoded Snippet in Block Notation:
[S-5][value][S-5][short]
For larger strings one can use the S marker (value 12) with an additional length (N) marker. This means one can use up to 5 bytes (1 for the marker+1-4 bytes for the length) to encode length and type marker.
Example
Uncoded Object Notation:

```
{
    "value" : "<... a very long value ...>",
}
```

Encoded Snippet in Block Notation:
[S-5][value][S][N][< . . . a very long value . . . >]
Some object notation specifications do not dictate a specific required encoding, but UTF-8 can be used as the default encoding.
UTF-8 can be used for string encoding. Such encodings can support exchanging binary object notation between open systems that support and follow such encoding.
The String type in the encoded format can be equivalent to the string type from the uncoded object notation specification.
Container Types
At least two container types can be defined in the encoding format:
1. Array Type
2. Object Type
The same start/end markers can be used in the encoded format as the unencoded formation, allowing streaming; the containers can be written out on-demand without knowing the size of the container ahead of time.

The array type in the encoded format can be defined as:

| Type | Size | Marker | Marker Value | Length | Data Payload |
|---|---|---|---|---|---|
| Array | 5+ bytes | [ | 50 | Yes | Yes, if not empty |

First byte can be the marker followed by 4 bytes (BS) for the size in bytes of the array.
An Example Uncoded Array:

```
[
    null,
    true,
    false,
    4782345193,
    153.132,
    "ham"
]
```

Encoded Snippet in Block Notation:

```
[[ ][BS]
[Z]
[T]
[F]
[l][4782345193]
[d]9153.132]
[S-3][ham]
```

The object type in the encoded format can be defined as:

| Type | Size | Marker | Marker Value | Length | Data Payload |
|---|---|---|---|---|---|
| Object | 5+ bytes | {and \| | 40 | Yes | Yes, if not empty |

An element in an object can include two parts, the key which is type string and the value which can be any encoded type. The first byte can be the marker followed by 4 bytes (BS) to store the size in bytes of the object.
Uncoded Object Notation Example:

```
{
    "post" : {
        "id" : 1137,
        "author" : "rkalla",
        "timestamp" : Date("1364482090592"),
        "body" : "I totally agree!"
    }
}
```

Encoded Snippet in Block Notation

```
[{][BS]
    [S-4][post]p{][BS]
        [S-2][id][I][1137]
        [S-6][author][S-5][rkalla]
        [S-9][timestamp][t][1364482090592]
        [S-4][body][S-16][I totally agree!]
```

In any of the examples herein, optimizations can be employed.

In the following example, key and value are of type string:

```
{
    "key" : "value"
}
```

It can be typical to store multiple encoded documents that have the same or similar keys like in:

```
{ "age": 32, "name": "Maria", "city": "London" }
{ "age": 47, "name": "Jane", "city": "New York" }
```

The strings for the keys ("age", "name", "city") are redundant data and can be stored more efficiently using a dictionary. So one can also store the same documents the following way as described herein:

```
["age", "name", "city"]
{ 0:32, 1: "Maria", 2: "London" }
{ 0:47, 1: "Jane", 2: "Berlin" }
{ 0:53, 1: "Bill", 2: "New York" }
```

The first array is the dictionary and the keys in the object have been replaced by the corresponding dictionary index. Instead of using the string type for the keys one now uses the ValueID type, which is basically identical to the length type and stores a compressed integer up to 2^30−1. This is also the max size of the dictionary. So with this the example from above looks like:

```
[{}][BS]
    [S-4][post]
    [S-2][id]
    [S-6][author]
    [S-9][timestamp]
    [s-4][body]
[{}][BS]
    [V][N-0][post][{}][BS]
        [V][N-1][I][1137]
        [V][N-2][S-5][rkalla]
        [v][N-3][t][1364482090592]
        [V][N-4][S-16][I totally agree!]
```

When comparing values of different encoded types one can use the following order, from lowest to highest:
 1. Null
 2. Numbers: int8, uint8, int16, int32, int64, float32 and float64
 3. Boolean
 4. Object
 5. Array
 6. ObjectID The format can treat some types as equivalent for comparison purposes. For instance, types undergo conversion before comparison.

The comparison can treat a non-existent field as it would an empty encoded data object. As such, a sort on the a field in documents { } and {a:null} can treat the documents as equivalent in sort order.

With arrays, a less-than comparison or an ascending sort can compare the smallest element of arrays, and a greater-than comparison or a descending sort compares the largest element of the arrays. As such, when comparing a field whose value is a single-element array (e.g. [1]) with non-array fields (e.g. 2), the comparison is between 1 and 2. A comparison of an empty array (e.g. [ ]) can treat the empty array as less than null or a missing field.

ObjectIds can be small, likely unique, fast to generate, and ordered. These values can be of 12-bytes, where the first four bytes are a timestamp that reflect the ObjectId's creation.

Example 30

Example Implementation

In any of the examples herein, the uncompressed (block) format can be dictionary compressed (further encoded). An example using specific byte sizes that can be varied in practice follows.

For a data object {"name":"Steffen","age":25}, the uncompressed binary format can appear as:
 1 byte: Type marker for data object
 4 bytes: size of the object in bytes
 1 byte: Type marker for string and size of the string 'name'
 4 bytes: The string 'name'
 1 byte: Type marker for string and size of the string 'Steffen'
 7 bytes: The string 'Steffen'
 1 byte: Type marker for string and size of the string 'age'
 3 bytes: The string 'age'
 1 byte: Type marker for type int8
 1 byte: The value 25

For strings with length up to 127, one can store the size and type marker for the string in the same byte. So the most significant byte indicates that it is a string, and the remaining 7 bits are used to encode the string size. For larger strings, one can use the type marker type to only store that the following value is a string, and 1-4 additional bytes are used to encode the size.

A minimum number of bytes can be used to store integer values.

For a dictionary compressed version, one can restructure the above object so that it appears as:
 Dictionary:
  0: name
  1: age
 Document:
  {0:"Steffen",1:25}

A size field in the data object can contain:
 1 byte: type marker for compressed data object
 3 bytes: number of key-value pairs in the object
 4 bytes: size of the object in bytes.

Example 31

Example Computing Systems

Figure 17:
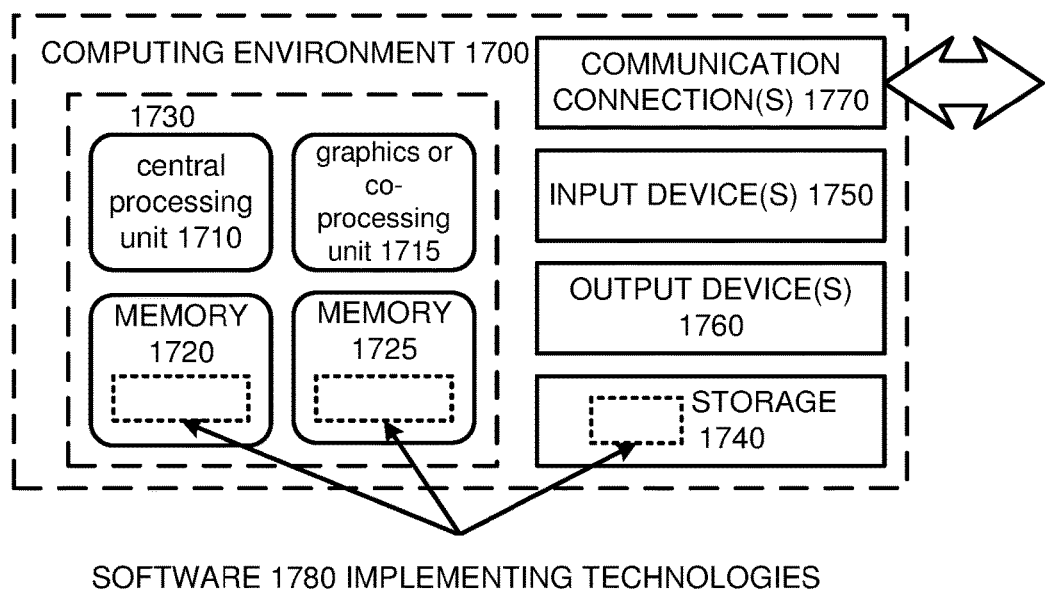
FIG. 17 is a diagram of an example computing system in which described embodiments can be implemented.

FIG. 17 illustrates a generalized example of a suitable computing system 1700 in which several of the described innovations may be implemented. The computing system 1700 is not intended to suggest any limitation as to scope of use or functionality, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s).

A computing system may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. For video encoding, the input device(s) 1750 may be a camera, video card, TV tuner card, or similar device that accepts video input in analog or digital form, or a CD-ROM or CD-RW that reads video samples into the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 32

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. A method comprising:
receiving a data object, wherein the data object is represented by data object notation comprising a plurality of key name-value pairs comprising key names and respective values;
constructing an encoded version of the data object, wherein the constructing comprises:
representing the key names of the key name-value pairs of the data object with dictionary compression, wherein the dictionary compression represents the key names with respective key name identifiers that serve as indexes into a key name dictionary and are included in the encoded version of the data object in place of the key names; and
generating offsets for the values of the key name-value pairs of the data object and including the offsets in the encoded version, wherein the offsets point to value blocks representing respective of the values, and the respective key name identifiers that serve as indexes into the key name dictionary are associated with the offsets.

2. One or more computer-readable media comprising computer-executable instructions that when executed cause a computing system to perform the method of claim 1.

3. The method of claim 1 further comprising:
including a header in the encoded version of the data object, wherein the header indicates a size of the encoded version, and wherein the size indicates how many key name-value pairs are encoded in the data object.

4. The method of claim 1 wherein:
the encoded version of the data object is one of a plurality of encoded data objects in an encoded data object collection; and
the method further comprises:
receiving a target key name for search;
encoding the target key name with the key name dictionary; and
searching the encoded data object collection for the encoded target key name.

5. The method of claim 4 wherein:
the searching comprises searching the encoded data object collection for instances of the encoded target key name appearing in the encoded data object collection.

6. The method of claim 4 wherein:
the searching comprises searching for the encoded target key name with one or more single-instruction-multiple-data processor instructions.

7. The method of claim 1 further comprising:
storing type information describing data types of values stored for respective of the key names.

8. The method of claim 7 wherein:
a data type of mixed is indicated for a given key name out of the key names responsive to determining that the data types of values for the given key name are mixed.

9. The method of claim 7 wherein:
the encoded version of the data object is one of a plurality of encoded data objects in an encoded data object collection; and
the method further comprises:
receiving a query for the encoded data object collection; and
optimizing the query with the stored type information.

10. The method of claim 9 wherein:
optimizing the query comprises omitting type checking code responsive to determining that the stored type information indicates that a target key name has only data types in the encoded data object collection that do not necessitate type checking.

11. The method of claim 9 wherein:
optimizing the query comprises checking the stored type information to determine whether there are any values for a given key name.

12. The method of claim 1 further comprising:
representing values as respective value blocks, wherein a given value block comprises:
for a given value, a type field indicating a data type of the value; and
the value.

13. The method of claim 12 wherein:
the data type is selected from the group consisting of:
integer, float, null, array, date, and string.

14. The method of claim 1 wherein:
the encoded version of the data object is one of a plurality of encoded data objects in an encoded data object collection; and
the encoded data objects comprise a first key name-value pair with a value of a first data type and a second key name-value pair with a same key name as the first pair and a value of a second data type different from the first data type.

15. The method of claim 1 wherein:
the encoded version of the data object is one of a plurality of encoded data objects in an encoded data object collection representing JSON objects; and
the encoded data object collection represents a plurality of JSON documents comprising respective of the encoded data objects.

16. The method of claim 1, wherein the key name identifiers represent the key names.

17. A computing system comprising:
one or more processing units;
a stored key name dictionary comprising a plurality of key name entries indexed by a key name identifier identifying respective of the key name entries; and
a data object encoder receiving a data object in data object notation as input and generating an encoded data object in an encoded data object notation persistence format as output;
wherein the data object encoder is coupled to the stored key name dictionary and represents the encoded data object with one or more key name identifiers identifying key name entries appearing in the data object as key names, and wherein the key name identifiers are included in the encoded data object in place of the key names.

18. The computing system of claim 17 further comprising:
a search engine receiving a collection of encoded data objects comprising the encoded data object and outputting an indication of matches in the collection for a target key name identifier, wherein the search engine searches the collection for encoded data objects having the target key name identifier via the key name identifiers stored in the collection.

19. The computing system of claim 17 further comprising:
stored type information indicating whether data types of values occurring in a collection of data objects for a particular key name in the key name dictionary are mixed.

20. One or more computer-readable media comprising computer-executable instructions causing a computing system to perform a method of constructing an encoded version of a semi-structured document, the method comprising:
receiving the semi-structured document, wherein the semi-structured document comprises at least one data object represented by a lightweight data object notation persistence format comprising a plurality of attribute-value pairs comprising attributes and respective values and is represented in text form;
representing the attributes of the attribute-value pairs of the data object with dictionary compression, wherein the dictionary compression represents the attributes with respective scalar values as indexes into a dictionary of attributes;
including a header in the encoded version of the semi-structured document, wherein the header indicates a size of the encoded version;
for the attributes of the attribute-value pairs, including the respective scalar values representing the attributes in the encoded version of the semi-structured document;
for a given value out of the values represented in the attribute-value pairs:
including an offset in the encoded version, wherein the offset points to a block representing the given value of an attribute-value pair, wherein the block comprises a field indicating a type of the given value and a field representing the given value; and outputting the encoded version of the semi-structured document, wherein the encoded version comprises a binary representation of the semi-structured document.

21. The one or more computer-readable media of claim 20, wherein the respective scalar values representing the attributes are included in the encoded version of the data object in place of the attributes.

* * * * *